(12) United States Patent
Kanno

(10) Patent No.: US 11,657,163 B2
(45) Date of Patent: May 23, 2023

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 1013 days.

(21) Appl. No.: 16/282,491

(22) Filed: Feb. 22, 2019

(65) Prior Publication Data

US 2019/0362081 A1 Nov. 28, 2019

(30) Foreign Application Priority Data

May 22, 2018 (JP) .............................. JP2018-097908

(51) Int. Cl.
*G06F 21/60* (2013.01)
*G06F 3/06* (2006.01)
*G06F 21/71* (2013.01)

(52) U.S. Cl.
CPC .......... *G06F 21/602* (2013.01); *G06F 3/0604* (2013.01); *G06F 3/0658* (2013.01); *G06F 3/0679* (2013.01); *G06F 21/71* (2013.01)

(58) Field of Classification Search
CPC .... G06F 21/602; G06F 3/0604; G06F 3/0658; G06F 3/0679; G06F 21/71
See application file for complete search history.

(56) References Cited

U.S. PATENT DOCUMENTS

| | | | | |
|---|---|---|---|---|
| 8,862,902 B2* | 10/2014 | Hars | ................... | G06F 12/1408 713/193 |
| 2012/0166715 A1* | 6/2012 | Frost | ..................... | G06F 3/0656 711/E12.008 |
| 2013/0305061 A1* | 11/2013 | Yuan | ..................... | G06F 21/602 713/193 |
| 2014/0032935 A1* | 1/2014 | Kim | ..................... | G06F 21/6218 713/193 |
| 2014/0281587 A1* | 9/2014 | Ignatchenko | ........... | G06F 21/72 713/193 |
| 2015/0169472 A1 | 6/2015 | Yap et al. | | |

(Continued)

OTHER PUBLICATIONS

Yiying Zhang et al., "De-indirection for Flash-based SSDs with Nameless Writes", 10th USENIX Conference on File and Storage Technologies (FAST '12), Feb. 14-17, 2012, 16 Pages downloaded on Sep. 13, 2017 from: https://www.usenix.org/system/files/conference/fast12/zhang.pdf.

*Primary Examiner* — Noura Zoubair
*Assistant Examiner* — Zoha Piyadehghibi Tafaghodi
(74) *Attorney, Agent, or Firm* — Oblon, McClelland, Maier & Neustadt, L.L.P.

(57) ABSTRACT

According to one embodiment, a memory system includes a nonvolatile memory and a controller. In response to receiving from a host a write request designating a first address for identifying data to be written, the controller encrypts the data with the first address and a first encryption key, and writes the encrypted data to the nonvolatile memory together with the first address. In response to receiving from the host a read request designating a physical address indicative of a physical storage location of the nonvolatile memory, the controller reads both the encrypted data and the first address from the nonvolatile memory on the basis of the physical address, and decrypts the read encrypted data with the first encryption key and the read first address.

7 Claims, 29 Drawing Sheets

(56) References Cited

U.S. PATENT DOCUMENTS

| | | |
|---|---|---|
| 2017/0046281 A1 | 2/2017 | Chandra et al. |
| 2017/0090815 A1* | 3/2017 | Kelner .................. G06F 3/0679 |
| 2018/0011802 A1* | 1/2018 | Ndu ...................... G06F 21/602 |
| 2018/0137294 A1* | 5/2018 | Van Antwerpen .... G06F 3/0661 |

* cited by examiner

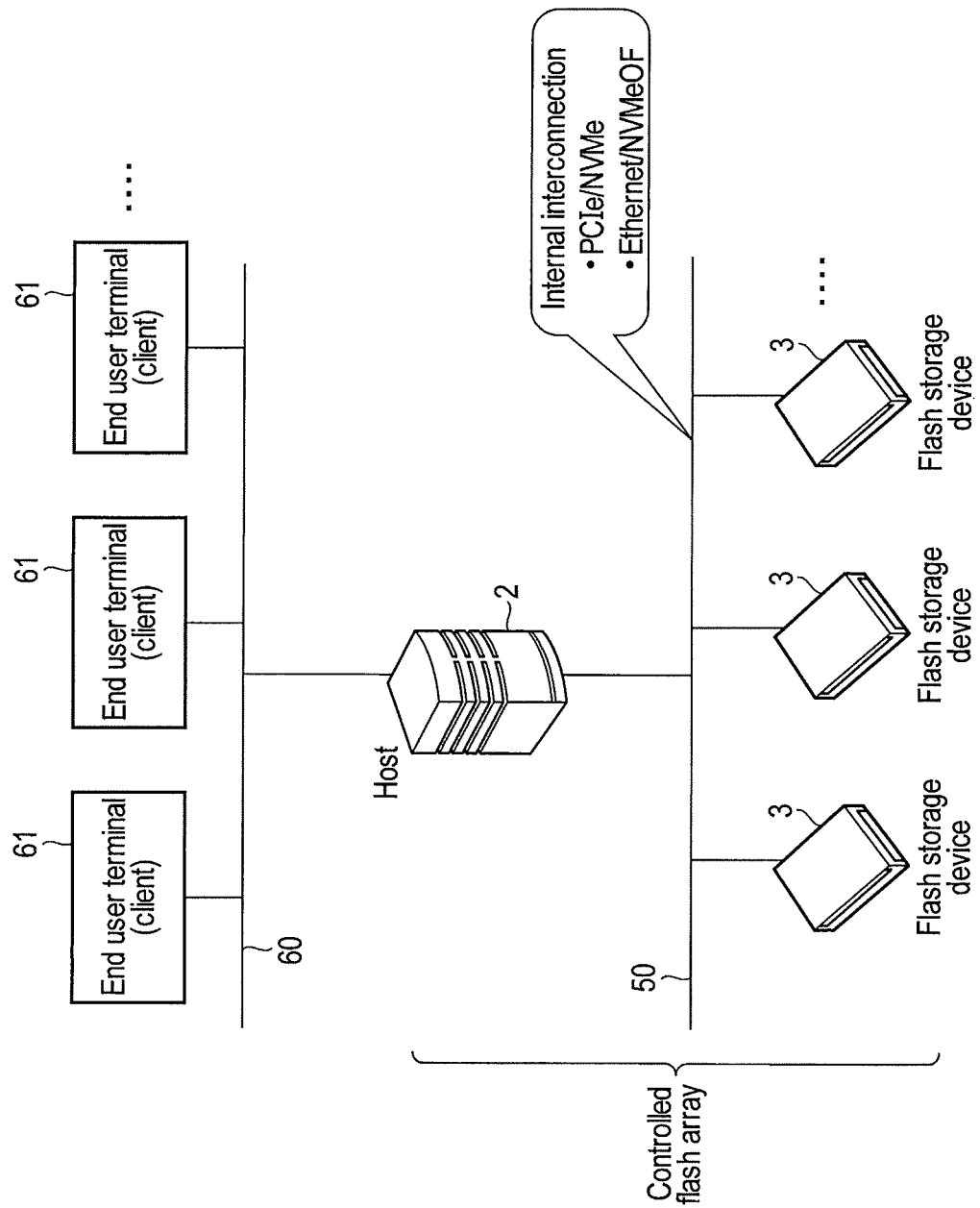
F I G. 1

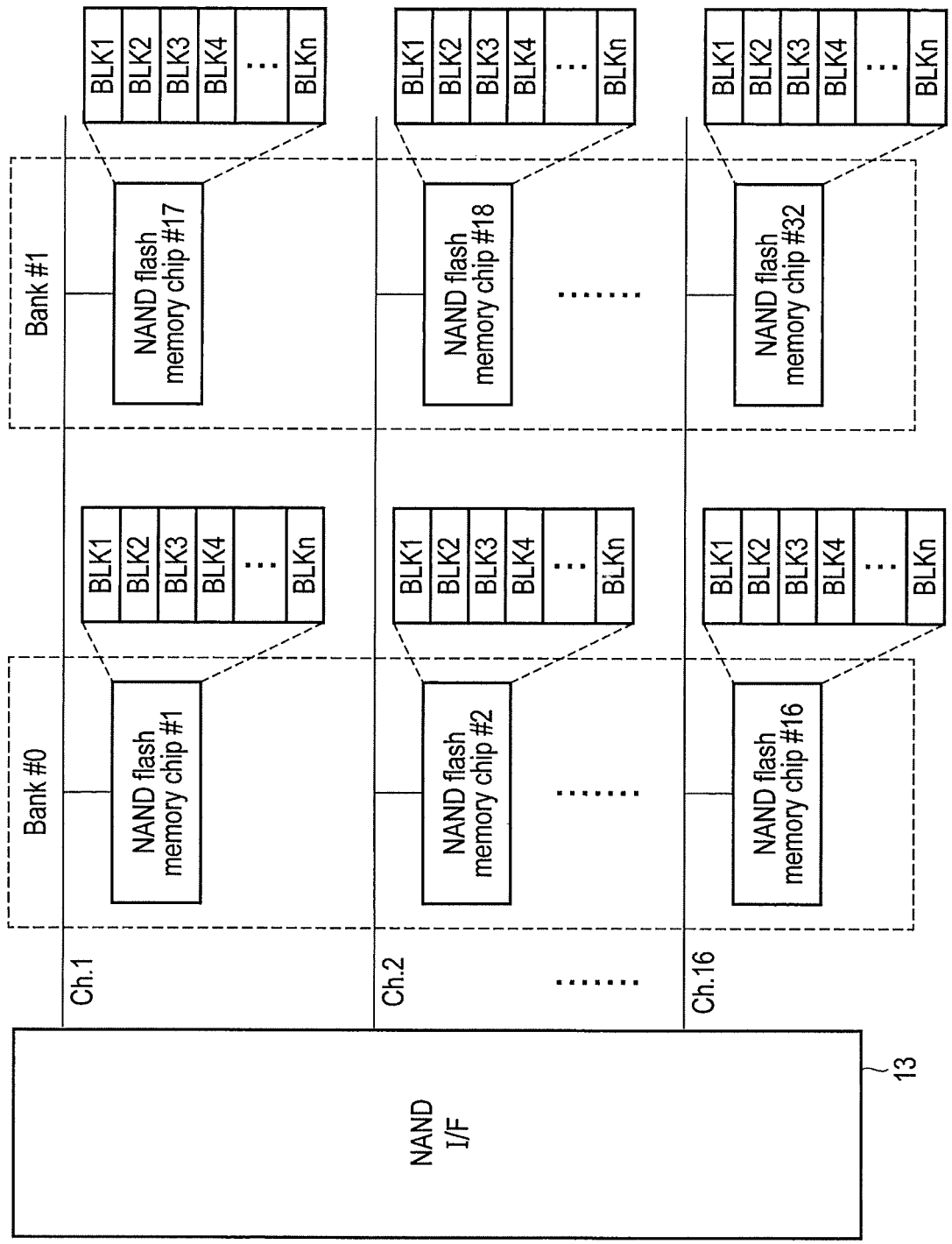
F I G. 4

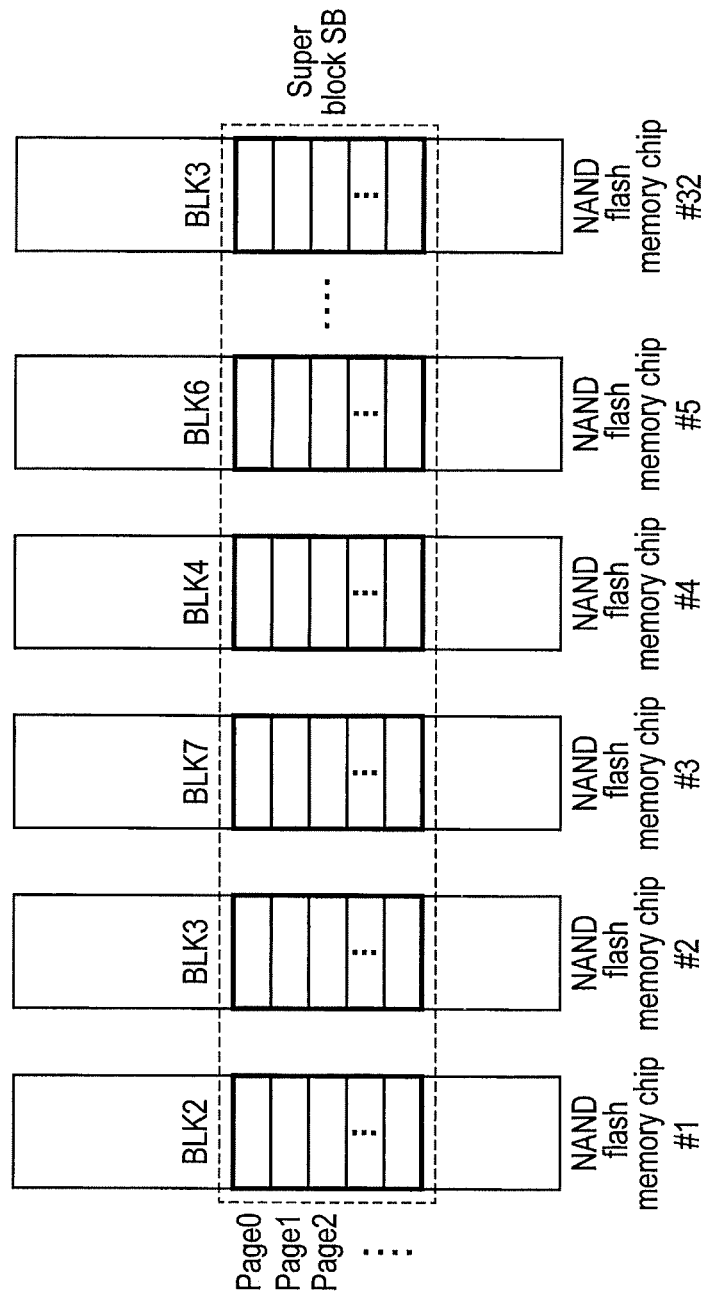
F I G. 5

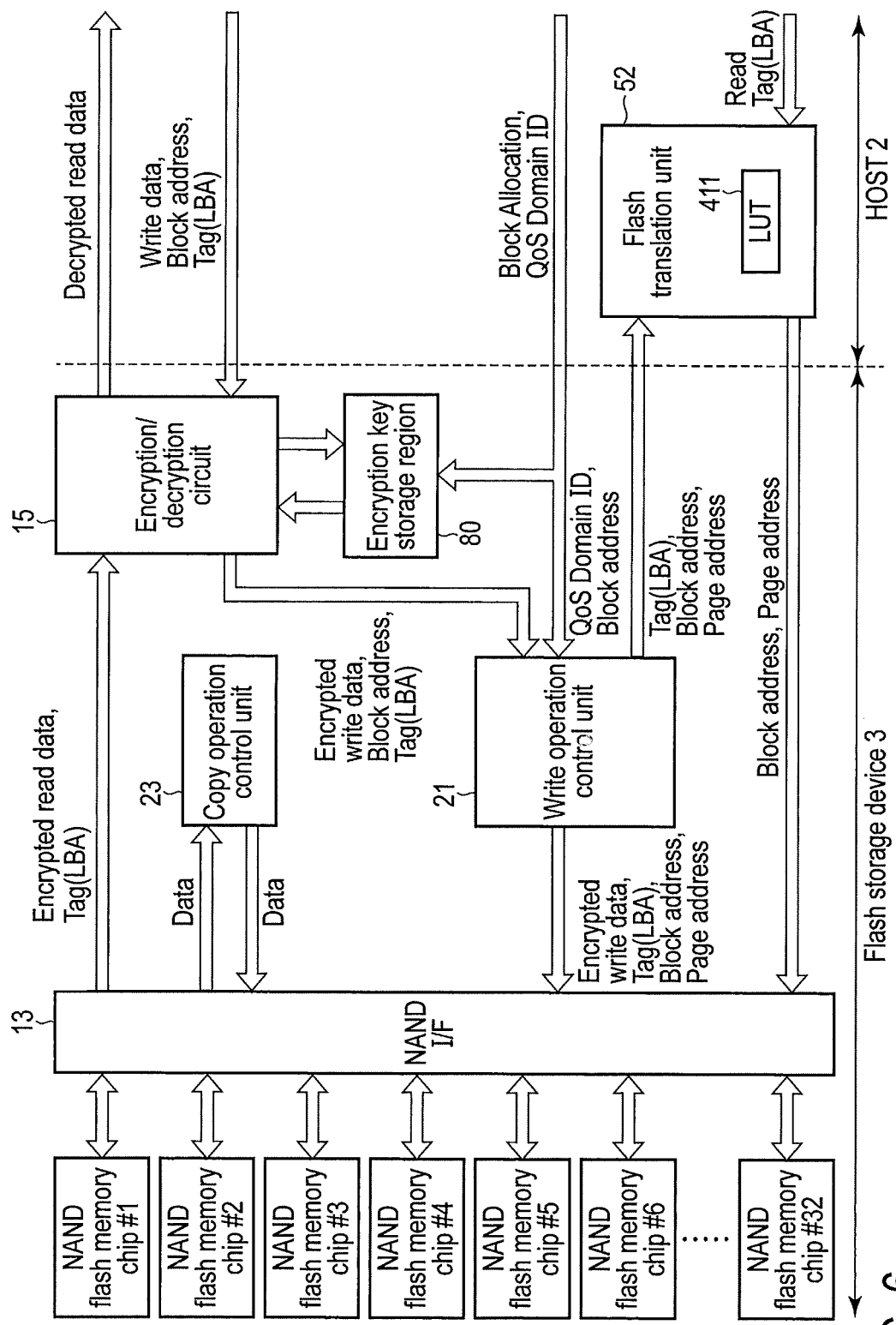
F I G. 6

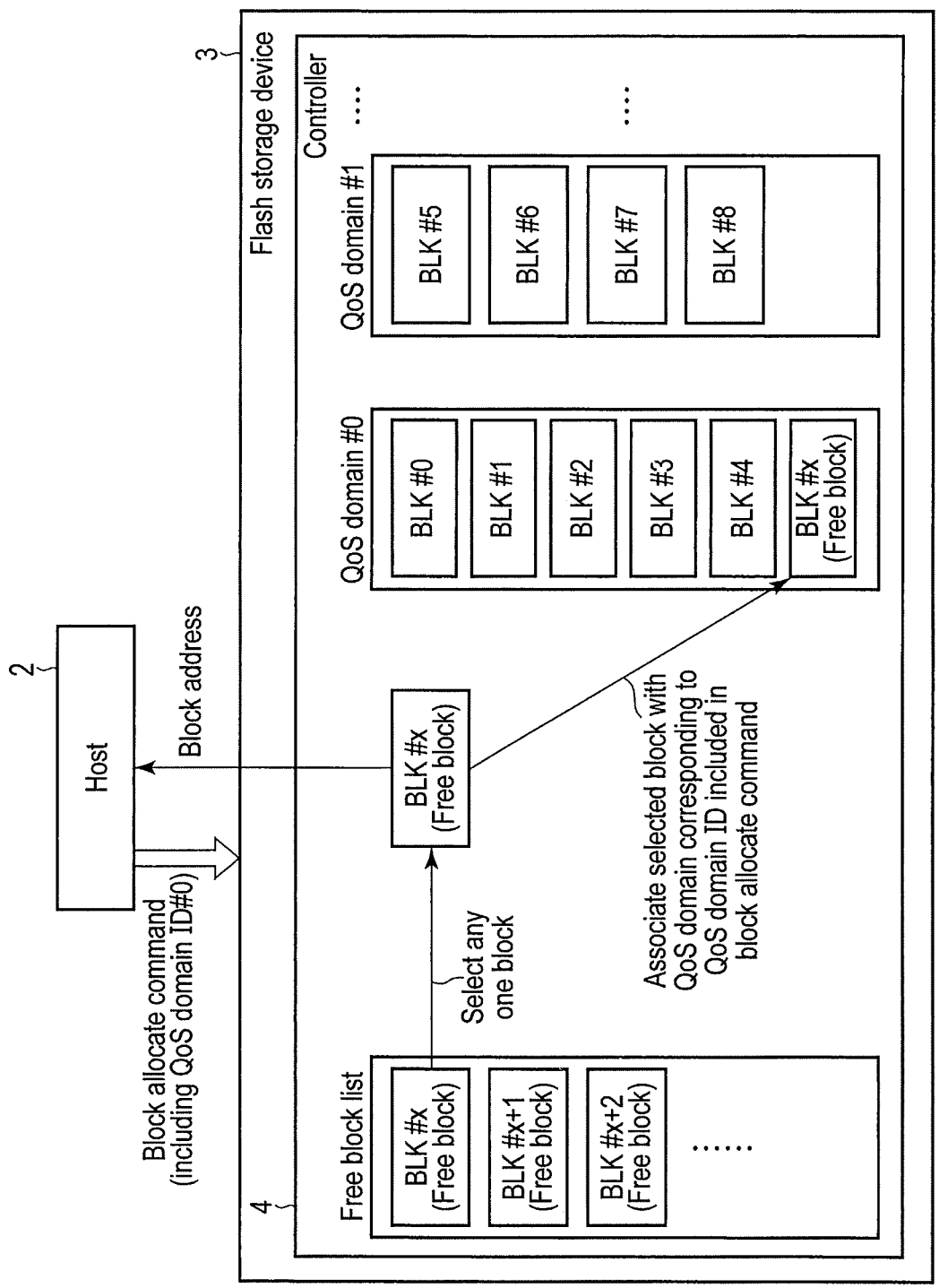
F I G. 8

QoS domain/block management table                    33A

| QoS domain ID | Block addresses |
|---|---|
| #0 | BLK#0, BLK#1, BLK#2, BLK#3, BLK#4, BLK#x |
| #1 | BLK#5, BLK#6, BLK#7, BLK#8 |
| #2 | BLK#9, BLK#12, BLK#15 |
| #3 | BLK#10, BLK#14, BLK#18 |
| #4 | BLK#11, BLK#16, BLK#21 |
| ⋮ | ⋮ |
| #k | BLK#31, BLK#32 |

F I G. 9

QoS domain/encryption key management table            33B'

| QoS domain ID | Encryption keys |
|---|---|
| #0 | KEY#0 |
| #1 | KEY#1 |
| #2 | KEY#2 |
| #3 | KEY#3 |
| #4 | KEY#4 |
| ⋮ | ⋮ |
| #k | KEY#k |

F I G. 10

Block/encryption key management table                 33C

| Block address ID | Encryption keys |
|---|---|
| BLK#0 | KEY#0 |
| BLK#1 | KEY#1 |
| BLK#2 | KEY#2 |
| BLK#3 | KEY#3 |
| BLK#4 | KEY#4 |
| ⋮ | ⋮ |

F I G. 11

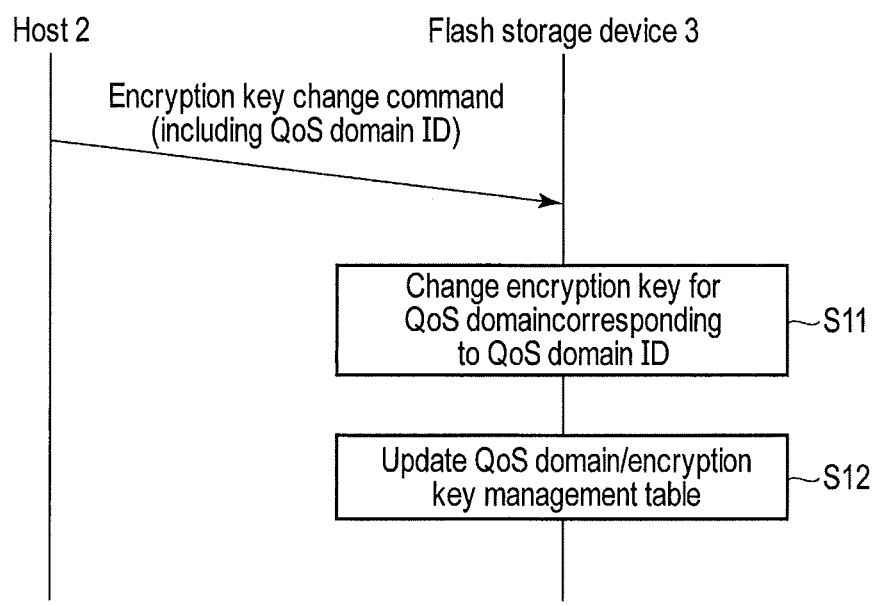
F I G. 12

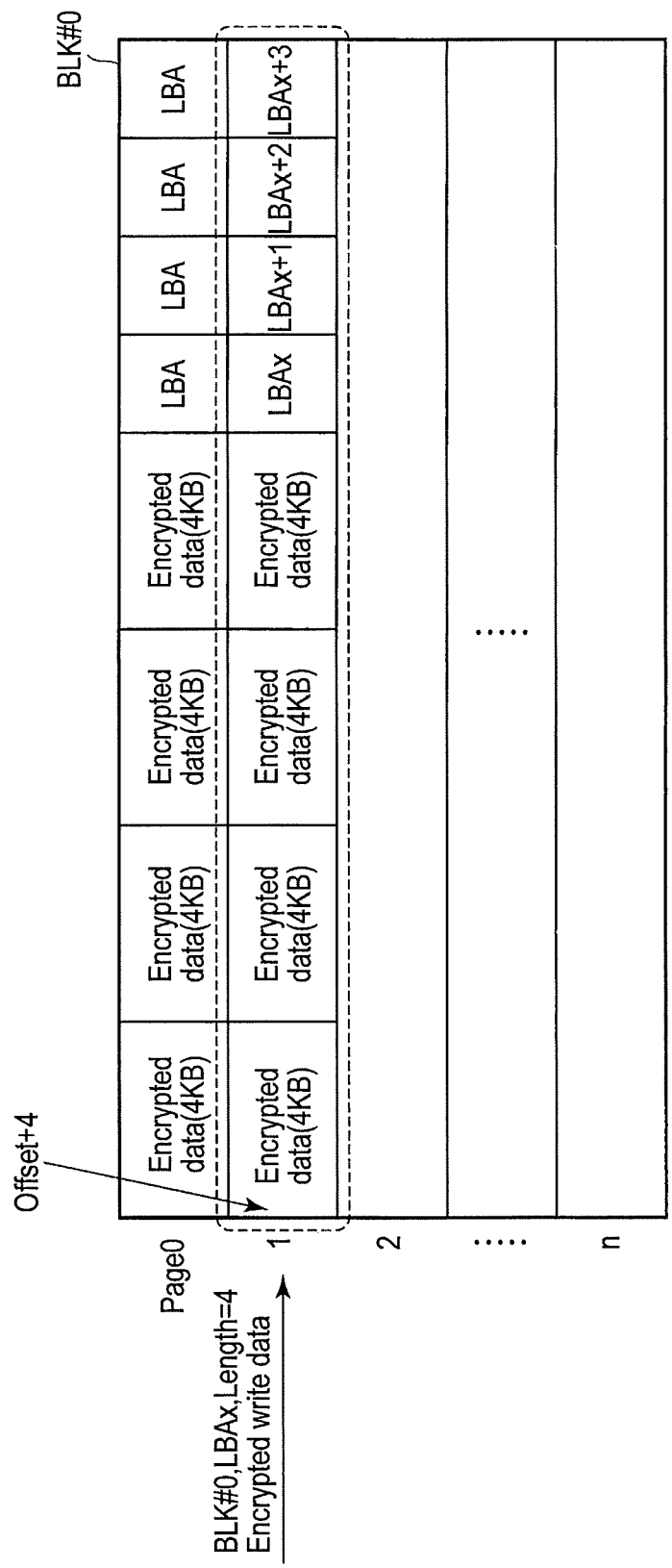
F I G. 14

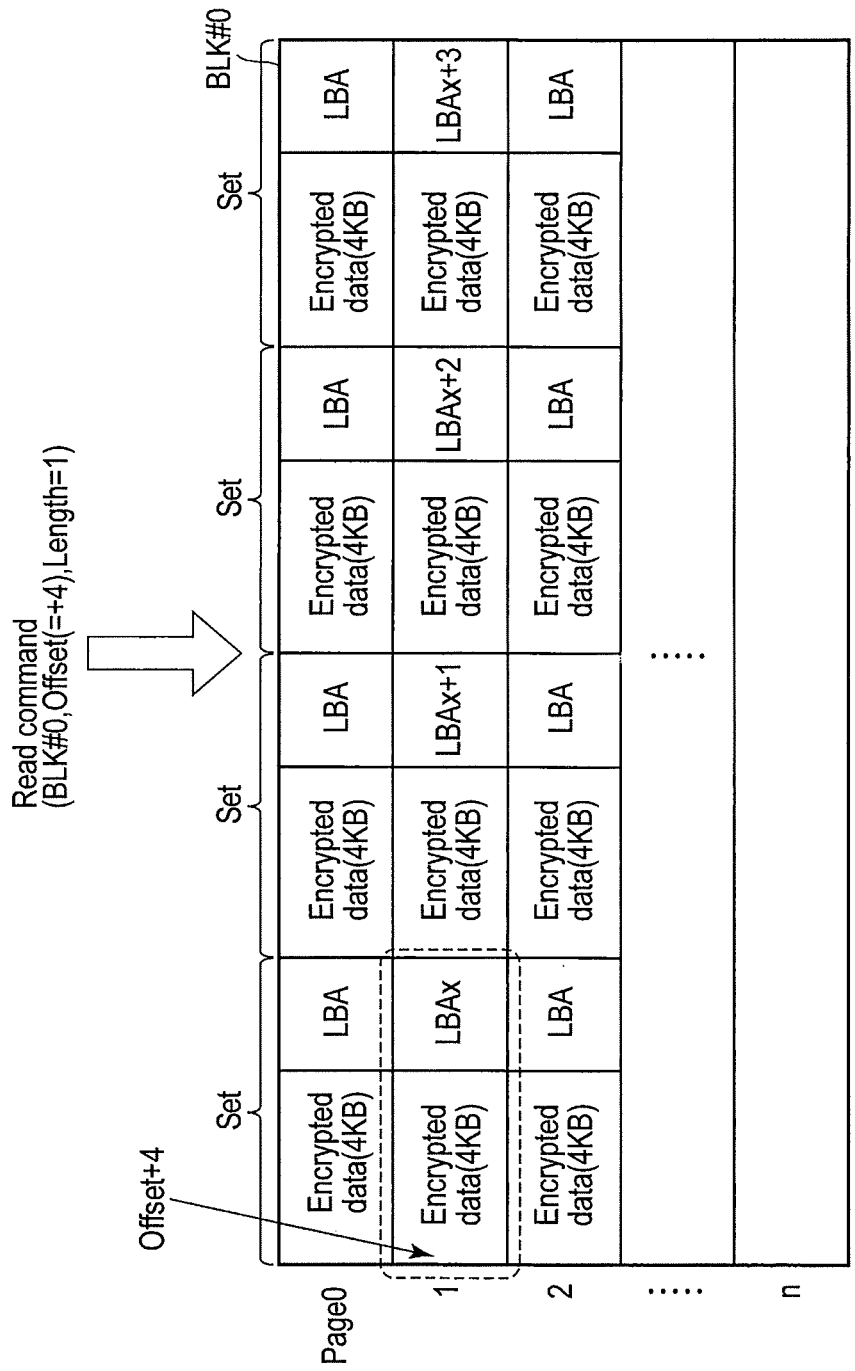
F I G. 15

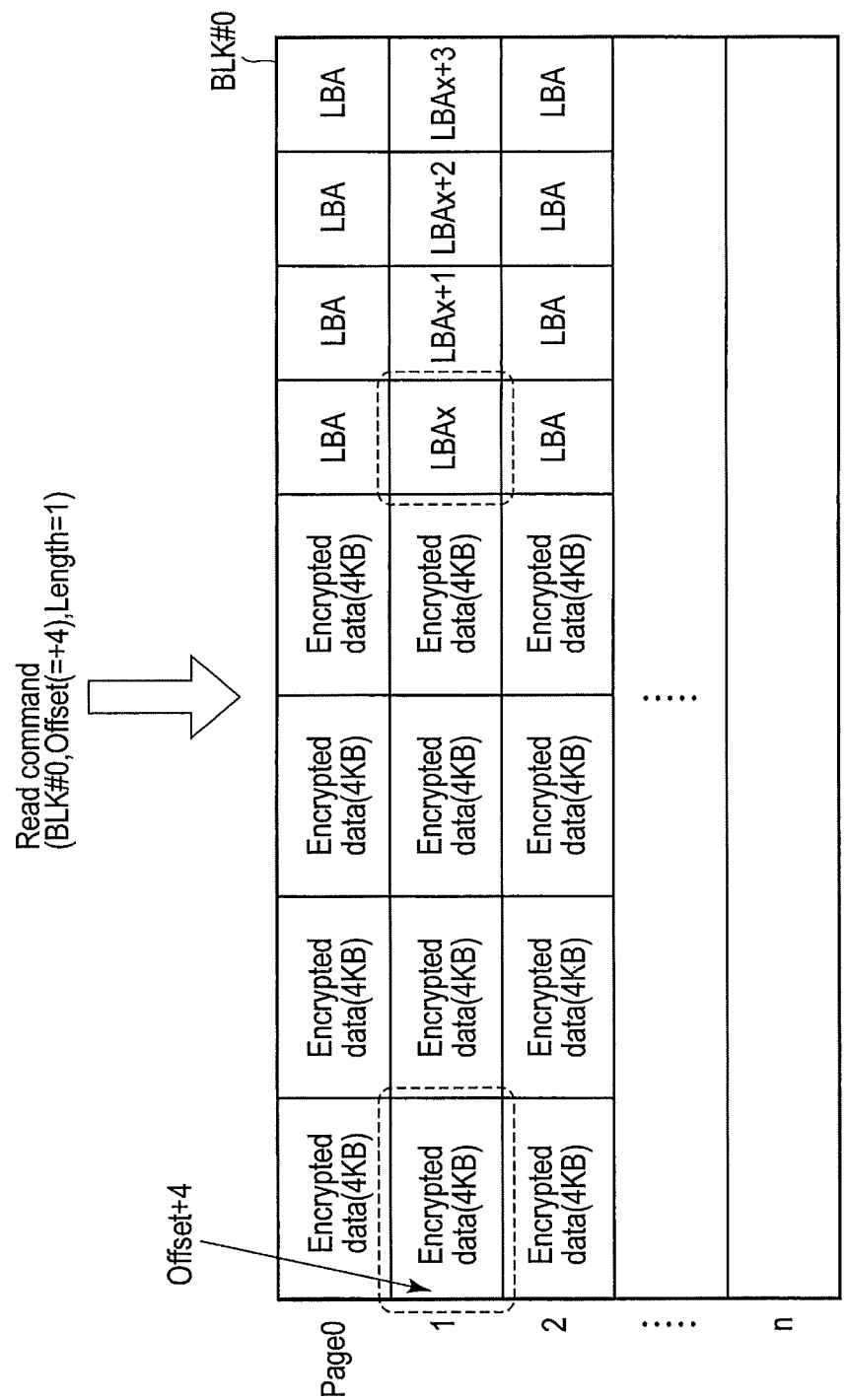
F I G. 16

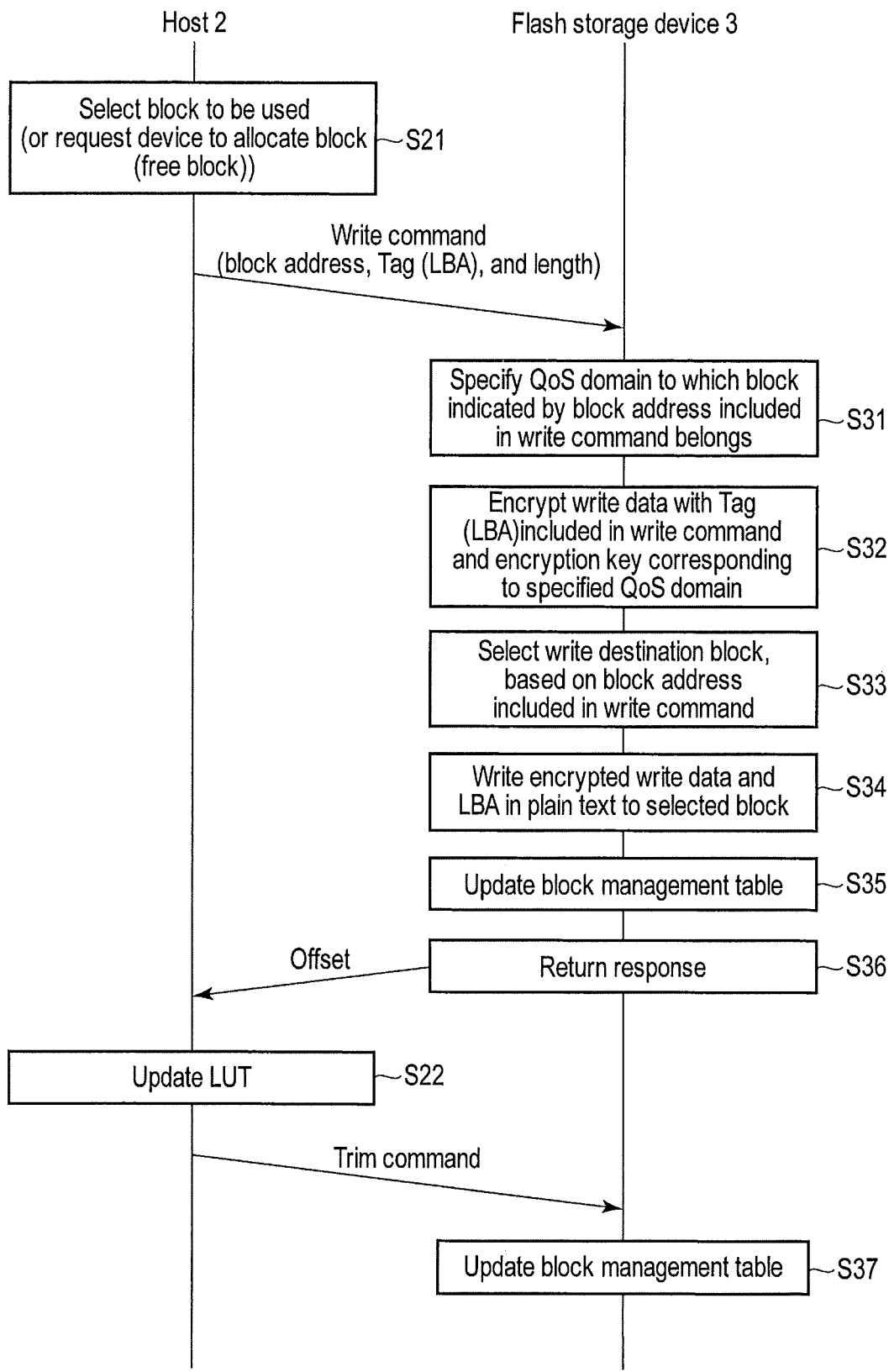
F I G. 17

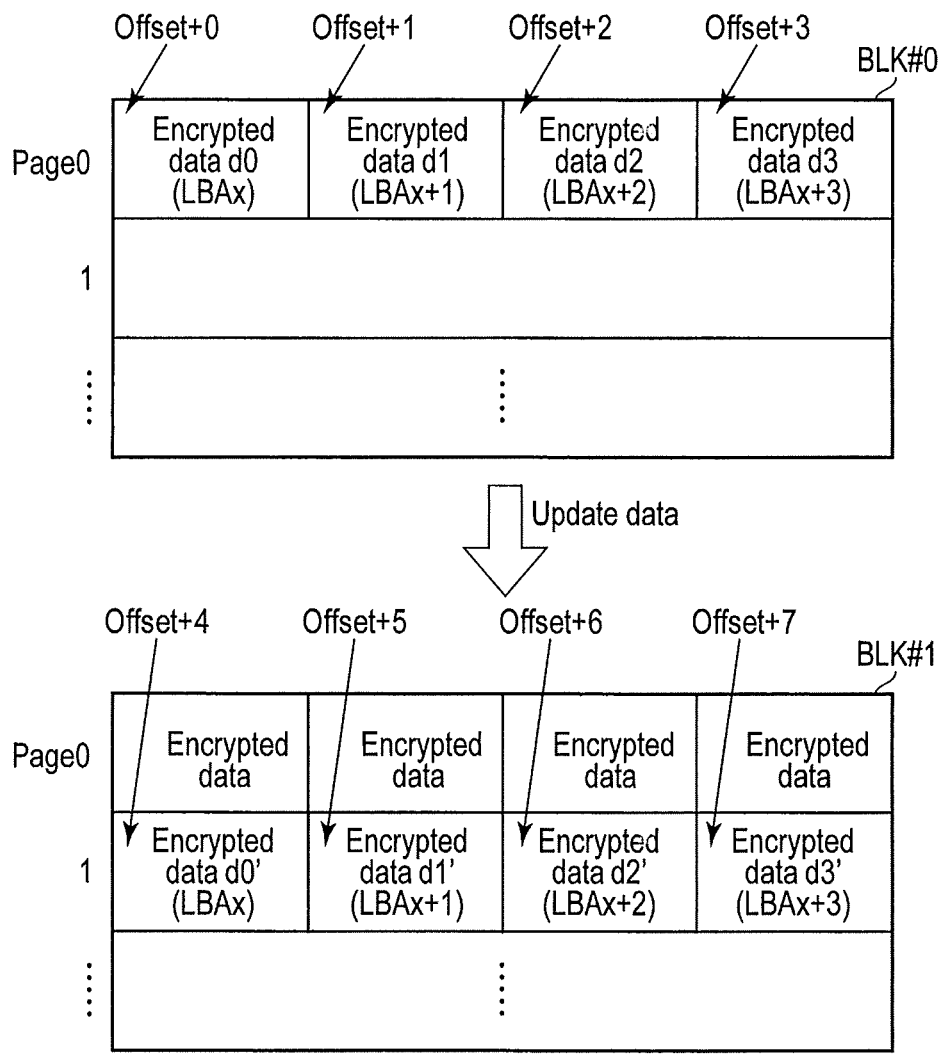
F I G. 18

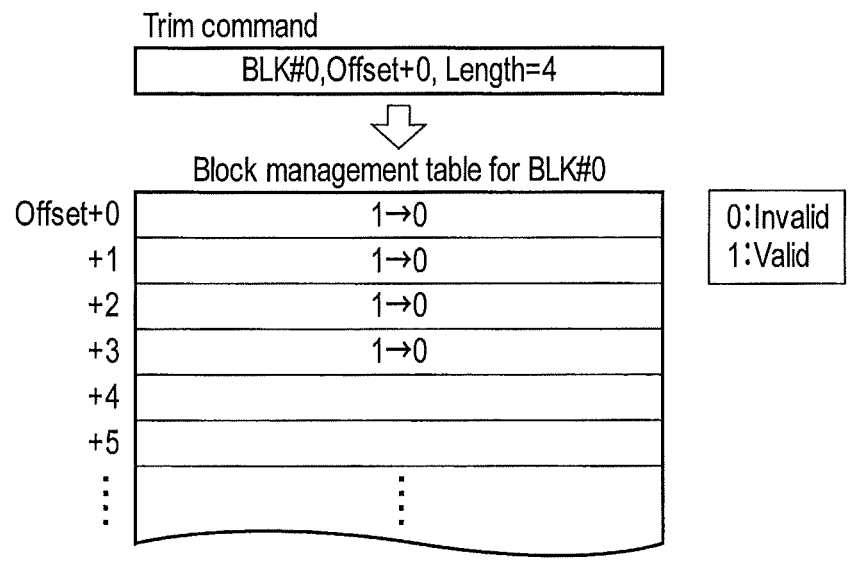
F I G. 21
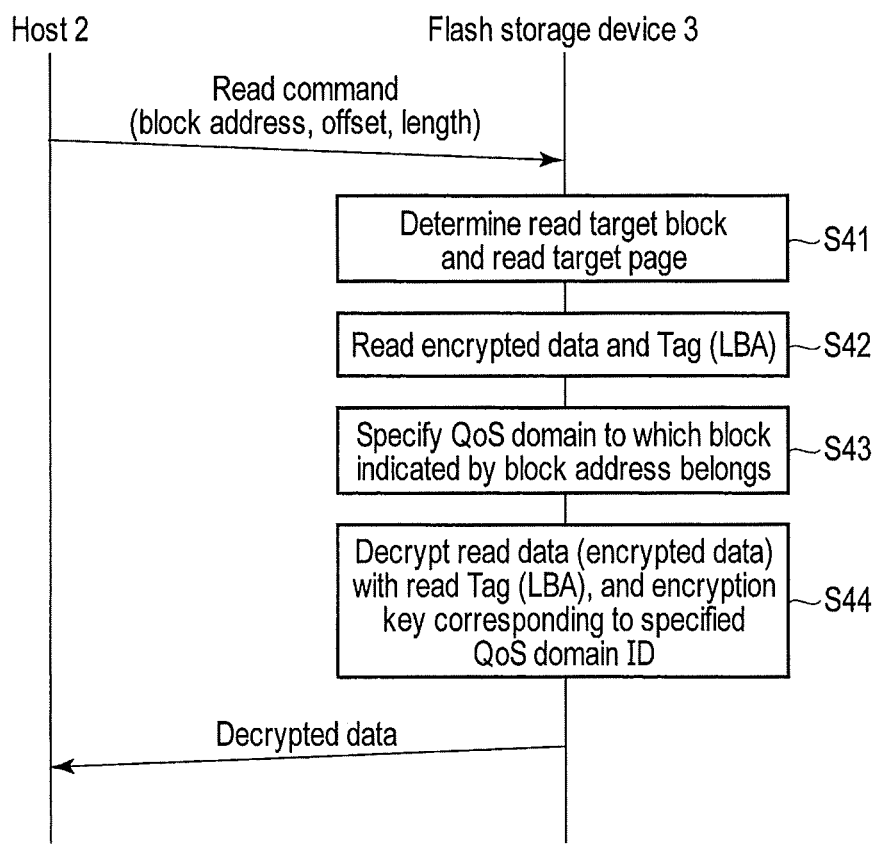
F I G. 22

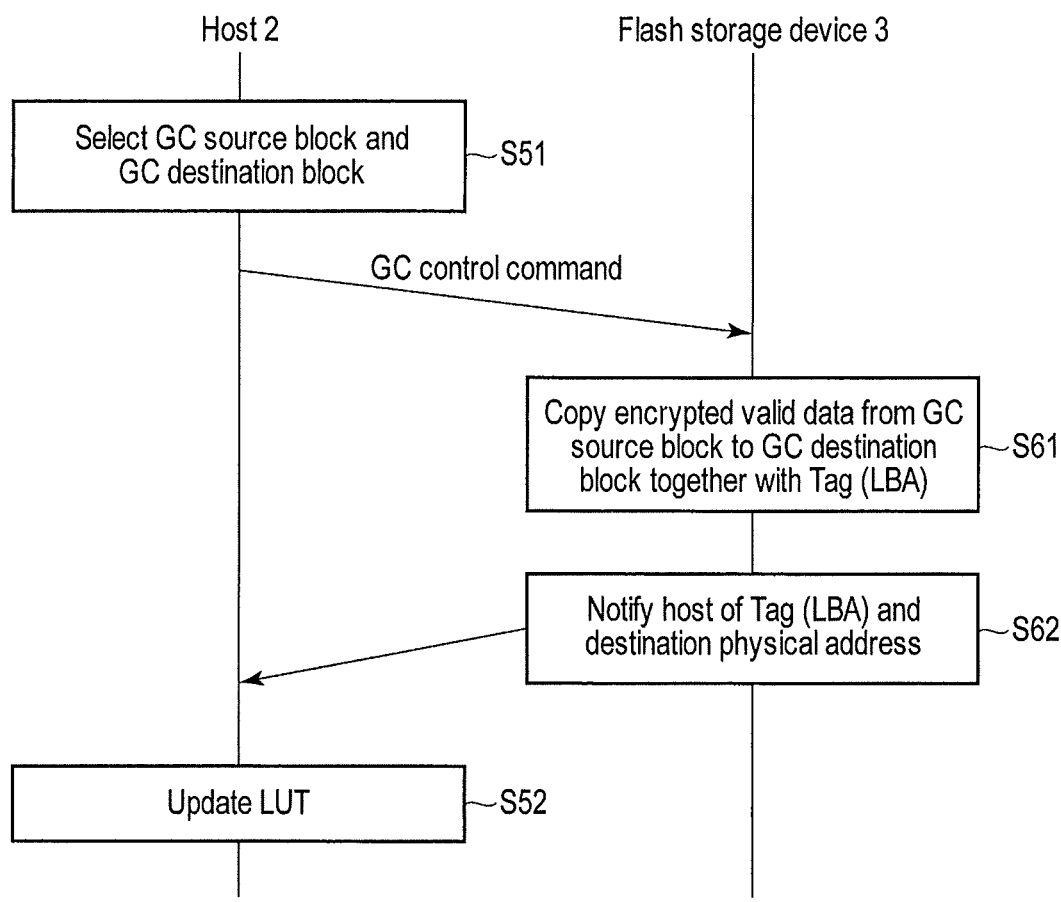
F I G. 23

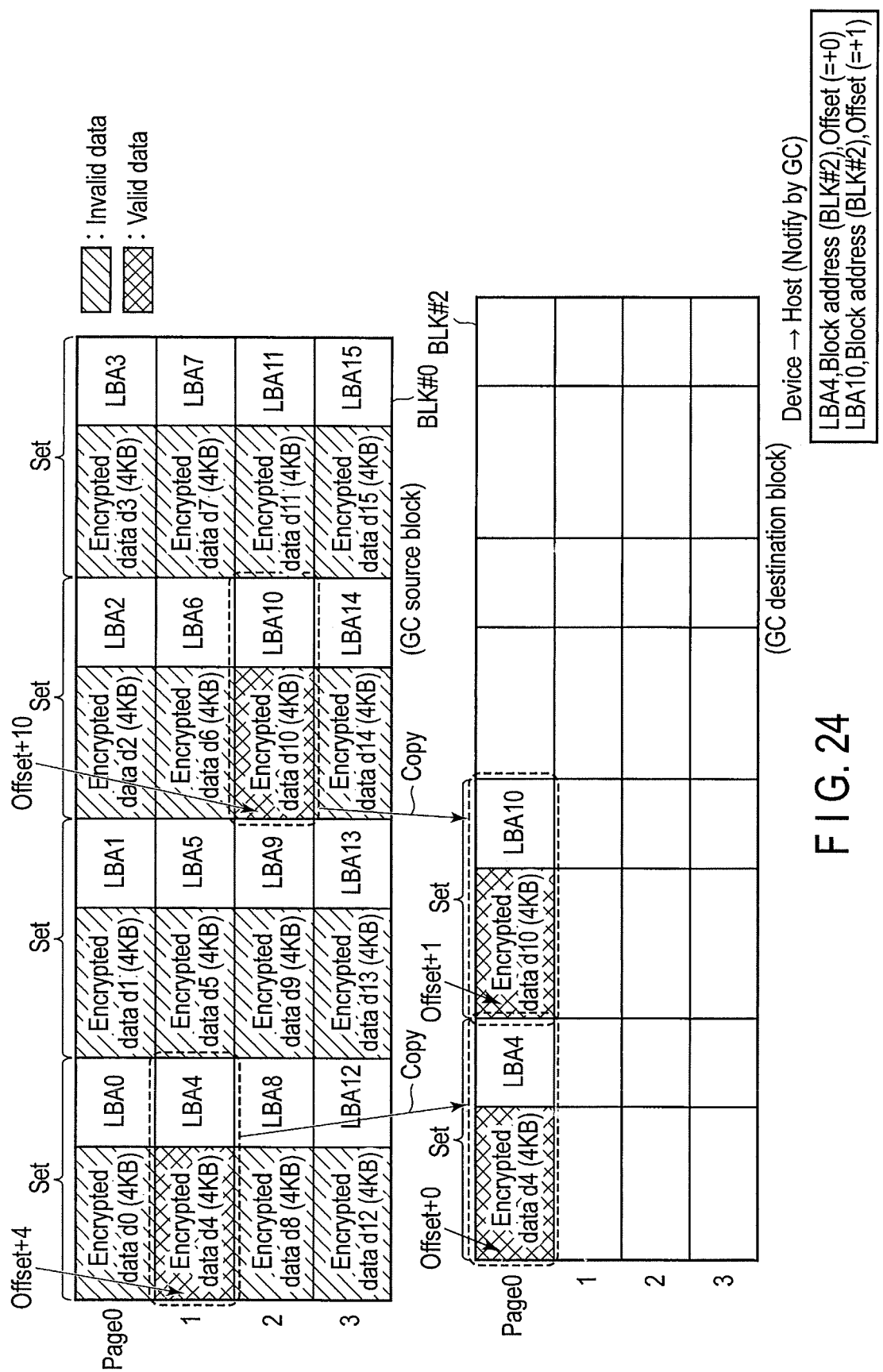
F I G. 24

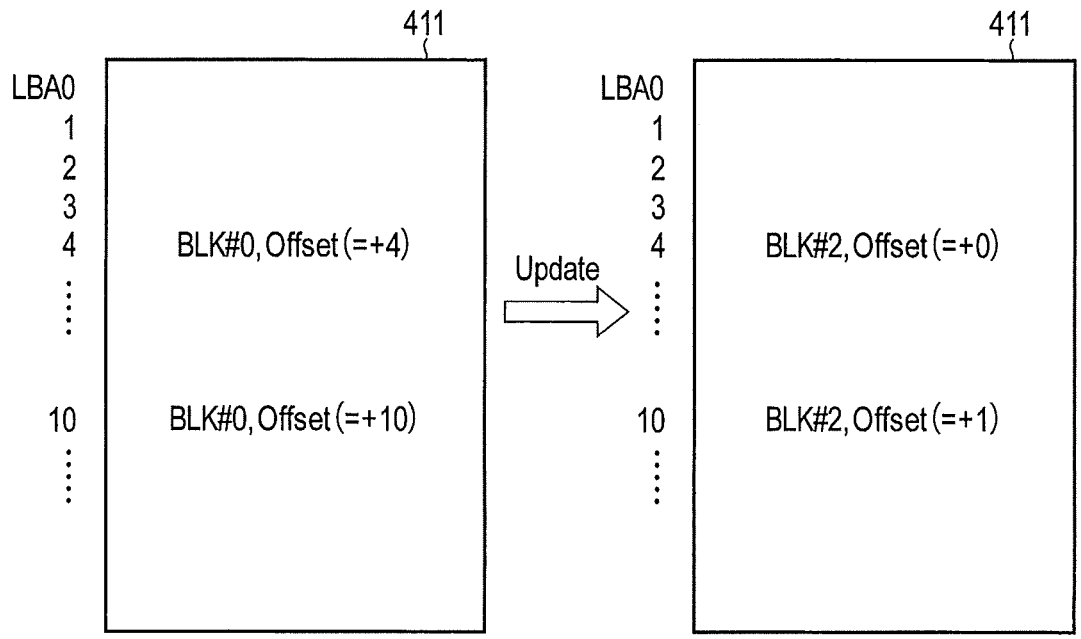
F I G. 25
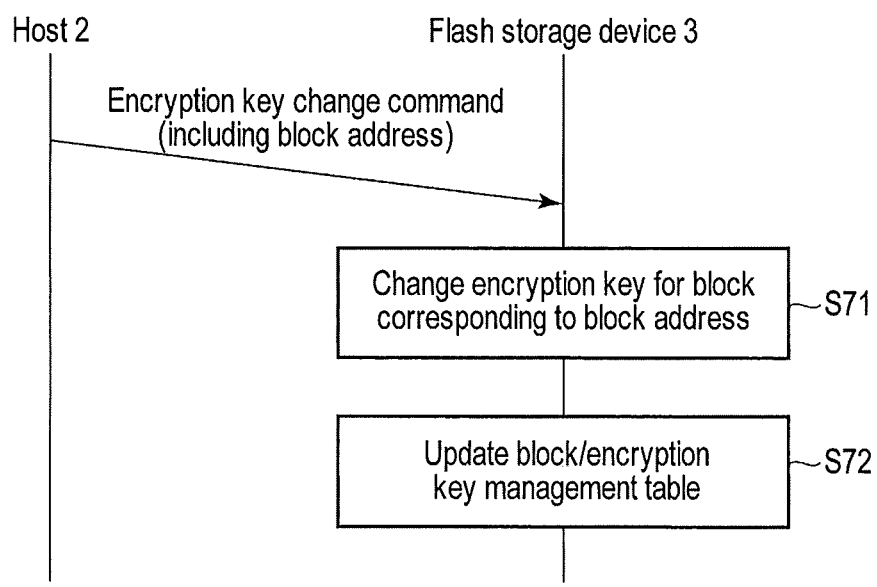
F I G. 26

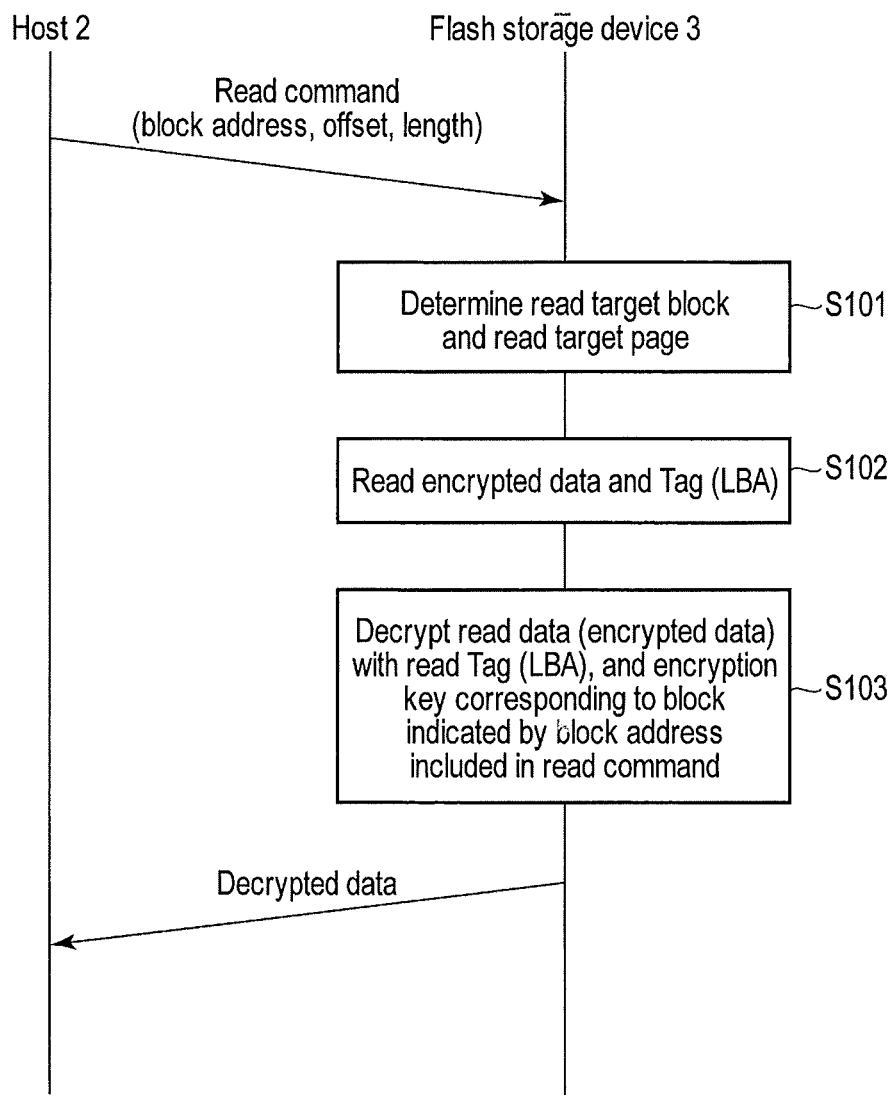
F I G. 28

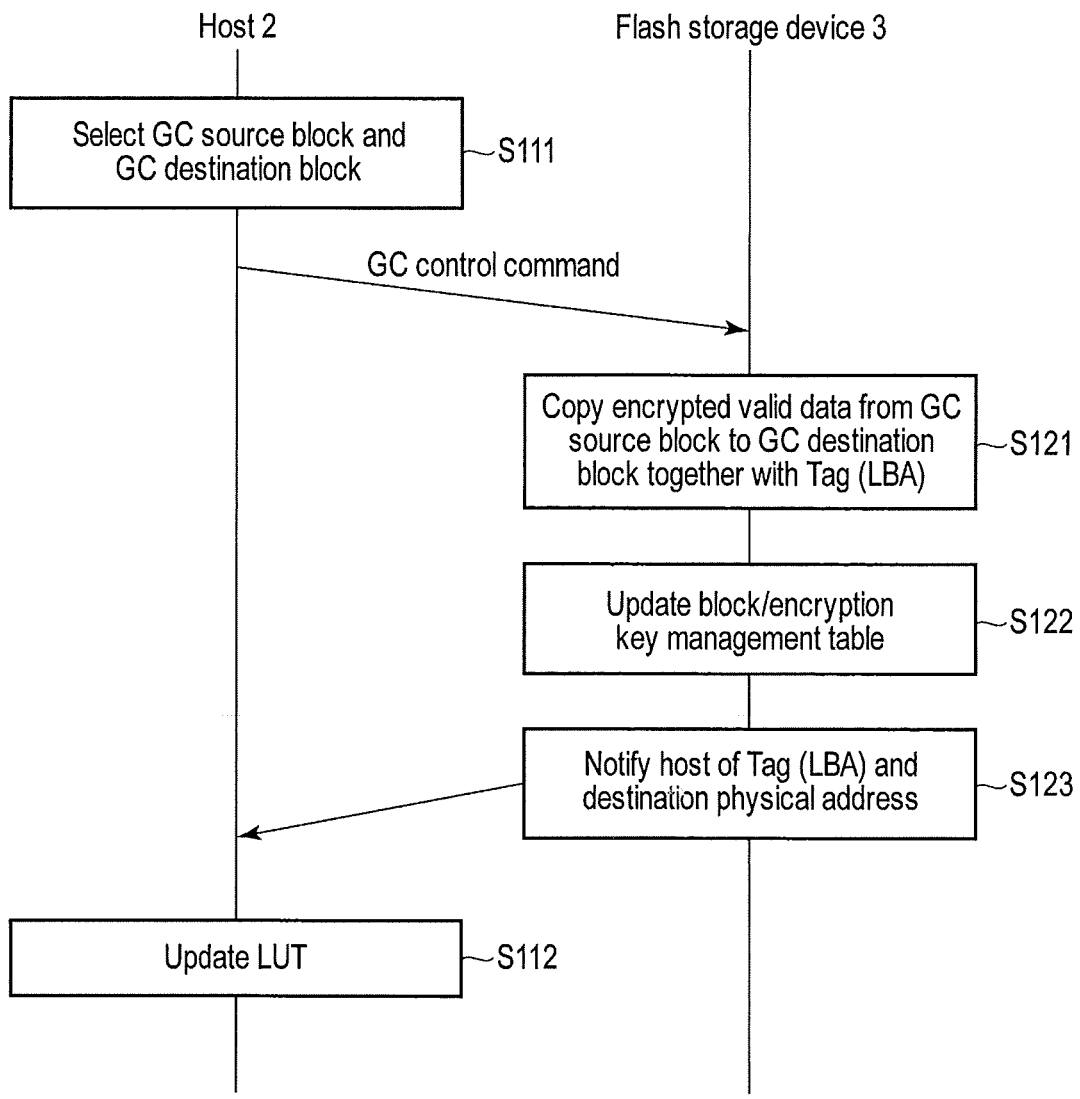
F I G. 29

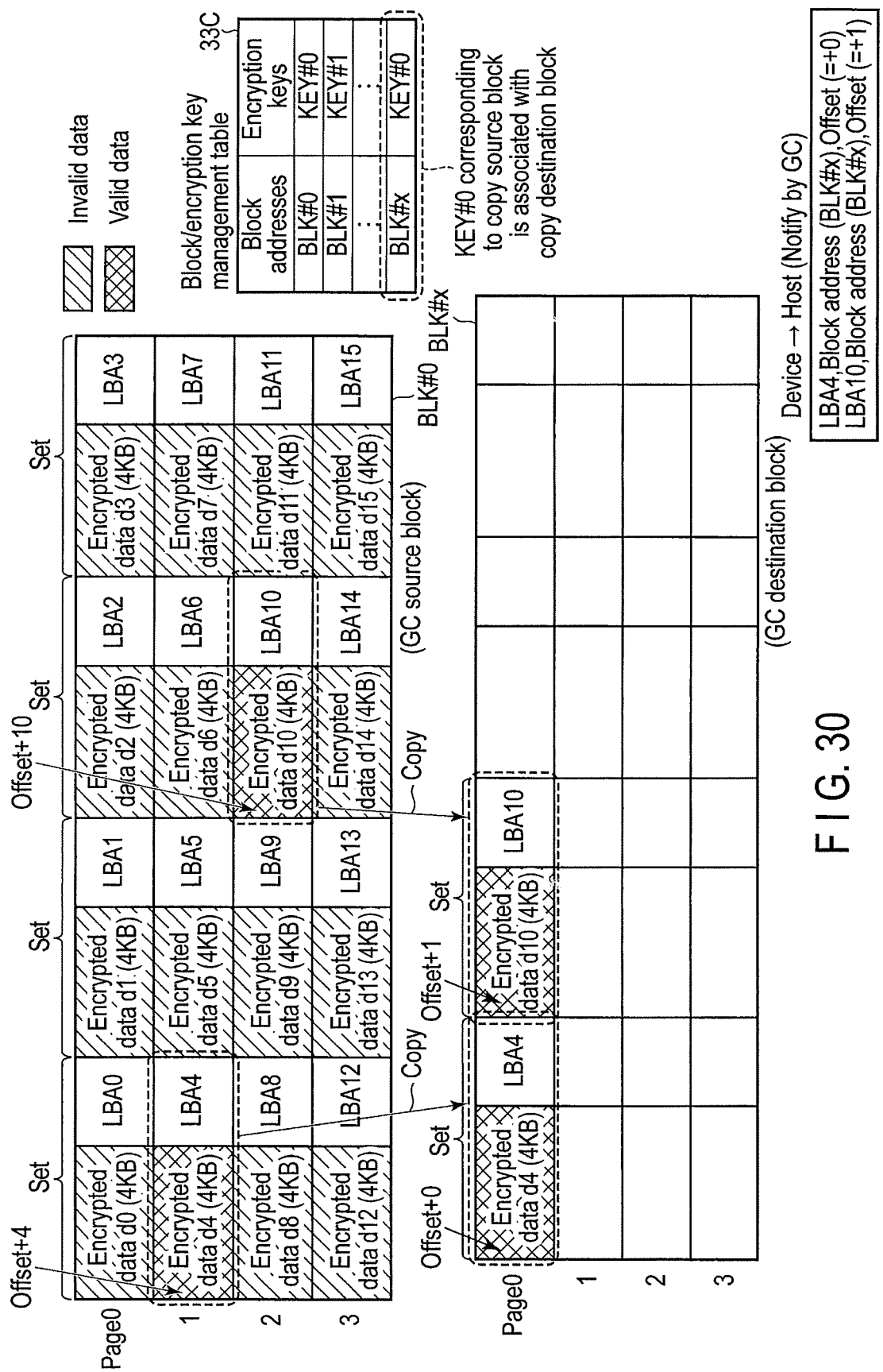
F I G. 30

Encryption key change command

| Parameter | Description |
|---|---|
| Command ID | Identify this command as key change command |
| QoS domain ID | Indicative of QoS domain corresponding to encryption key to be changed |
| | Host can request device to change encryption key and can thereby change encryption key of designated QoS domain. |

Block allocate command

| Parameter | Description |
|---|---|
| Command ID | Identify this command as block allocate command |
| QoS domain ID | Indicative of QoS domain with which free block is to be newly associated |
|  | Host can request device to allocate free block and can thereby acquire block address from device. |

F I G. 33

Response to block allocate command

| Parameter | Description |
|---|---|
| Block address | Device selects block to be allocated to host from free block list and returns block address of selected block to host. |
| QoS domain ID | Indicative of QoS domain with which block is associated |

F I G. 34

Write command

| Parameter | Description |
|---|---|
| Command ID | Identify this command as write command |
| Region ID (QoS domain ID or namespace ID) | Indicative of region where data is to be written |
| Block address | Physical address designating block where data is to be written |
| Tag (LBA) | Indicative of first logical location where data is to be written |
| Length | Length of data to be written |

F I G. 35

Response to write command

| Parameter | Description |
|---|---|
| Block address | Physical address designating block where data is written |
| In-block physical address | In-block physical address is indicative of location in block where data is written.<br>In-block physical address can be designated by block offset. |
| Length | Length of data to be written<br>(data length can be designated by number of Grain) |

F I G. 36

Trim command (capable of designating physical address)

| Parameter | Description |
|---|---|
| Command ID | Identify this command as trim command |
| Physical address | Physical address is indicative of fist physical storage location where data to be invalidated is stored.<br>Physical address can be designated by block address and offset. |
| Length | Length of data to be invalidated<br>(data length can be designated by number of Grain) |

F I G. 37

Read command

| Parameter | Description |
|---|---|
| Command ID | Identify this command as read command |
| Region ID<br>(QoS domain ID or namespace ID) | Indicative of region from which data is to be read |
| Physical address (PBA) | Physical address is indicative of first physical storage location from which data is to be read.<br>Physical address can be designated by block address and offset. |
| Length | Length of data to be read<br>(data length can be designated by number of Grain) |

F I G. 38

GC control command

| Parameter | Description |
|---|---|
| Command ID | Identify this command as GC control command |
| GC source block address | Host can designate which block is to be GC source block. |
| GC destination block address | Host can designate which block is to be GC destination block. |

FIG. 39

Callback command for GC

| Parameter | Description |
|---|---|
| Command ID | Identify this command as callback command for GC |
| Tag (LBA) | Logical address of copied valid data |
| Length | Length of copied valid data |
| Destination physical address | Destination physical address is indicative of location in GC destination block where valid data is copied.<br>Destination physical address can be designated by block address and offset. |

FIG. 40

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2018-097908, filed May 22, 2018, the entire contents of which are incorporated herein by reference.

FIELD

Embodiments described herein relate generally to a technology of controlling a nonvolatile memory.

BACKGROUND

In recent years, memory systems including nonvolatile memories have been widely prevalent. As such memory systems, a solid state drive (SSD) based on a NAND flash technology is known.

The memory systems such as the SSD are used as storage devices for various computers such as a server computer and a personal computer.

Recently, in the memory systems such as the SSD, implementation of a system of encrypting and decrypting data is required.

BRIEF DESCRIPTION OF THE DRAWINGS

FIG. 1 is a block diagram illustrating a configuration example of a computing system including a memory system (flash storage device) according to an embodiment.

FIG. 4 is a block diagram illustrating a relationship between plural NAND flash memory chips and plural channels, which are used in the memory system according to the embodiment.

FIG. 5 is a diagram illustrating a configuration example of a super block used in the memory system according to the embodiment.

FIG. 6 is a diagram illustrating an outline of each operation executed in the memory system according to the embodiment, together with a flow of data, tag (LBA), a block address, a page address, and a quality-of-service (QoS) domain ID.

FIG. 8 is a diagram illustrating block allocate processing executed in response to a block allocate command.

FIG. 9 is a QoS domain/block management table managed in the memory system according to the embodiment.

FIG. 10 is a QoS domain/encryption key management table managed in the memory system according to the embodiment.

FIG. 11 is a block/encryption key management table managed in the memory system according to the embodiment.

FIG. 12 is a sequence chart illustrating a sequence of encryption key change processing executed in the host and the memory system according to the embodiment.

FIG. 14 is another diagram illustrating the write operation executed in response to the write command.

FIG. 15 is a diagram illustrating a read operation executed in the memory system according to the embodiment.

FIG. 16 is another diagram illustrating the read operation executed in the memory system according to the embodiment.

FIG. 17 is a sequence chart illustrating a sequence of write processing executed in the host and the memory system according to the embodiment.

FIG. 18 is a diagram illustrating a data update operation of writing updated data corresponding to already written data.

FIG. 21 is a diagram illustrating an operation of updating the block management table in response to a notification from the host indicative of a block address and an in-block physical address which correspond to data to be invalidated.

FIG. 22 is a sequence chart illustrating a sequence of read processing executed in the host and the memory system according to the embodiment.

FIG. 23 is a sequence chart illustrating a procedure of a garbage collection (GC) operation executed in the host and the memory system according to the embodiment.

FIG. 24 is a diagram illustrating an example of a data copy operation executed for the garbage collection (GC).

FIG. 25 is a diagram illustrating contents of the lookup table of the host updated as a result of the data copy operation illustrated in FIG. 24.

FIG. 26 is a sequence chart illustrating another sequence of the encryption key change processing executed in the host and the memory system according to the embodiment.

FIG. 28 is a sequence chart illustrating another sequence of the read processing executed in the host and the memory system according to the embodiment.

FIG. 29 is a sequence chart illustrating another sequence of the garbage collection (GC) operation executed in the host and the memory system according to the embodiment.

FIG. 30 is a diagram illustrating another example of the data copy operation executed for the garbage collection (GC).

FIG. 33 is a table illustrating a block allocate command (block allocate request) issued to the memory system according to the embodiments.

FIG. 34 is a table illustrating contents of a response to the block allocate command.

FIG. 35 is a table illustrating a write command issued to the memory system according to the embodiment.

FIG. 36 is a table illustrating a response to the write command illustrated in FIG. 35.

FIG. 37 is a table illustrating a trim command issued to the memory system according to the embodiment.

FIG. 38 is a table illustrating a read command issued to the memory system according to the embodiment.

FIG. 39 is a table illustrating a garbage collection (GC) control command issued to the memory system according to the embodiment.

FIG. 40 is a table illustrating a callback command for GC issued to the memory system according to the embodiment.

DETAILED DESCRIPTION

Figure 2:
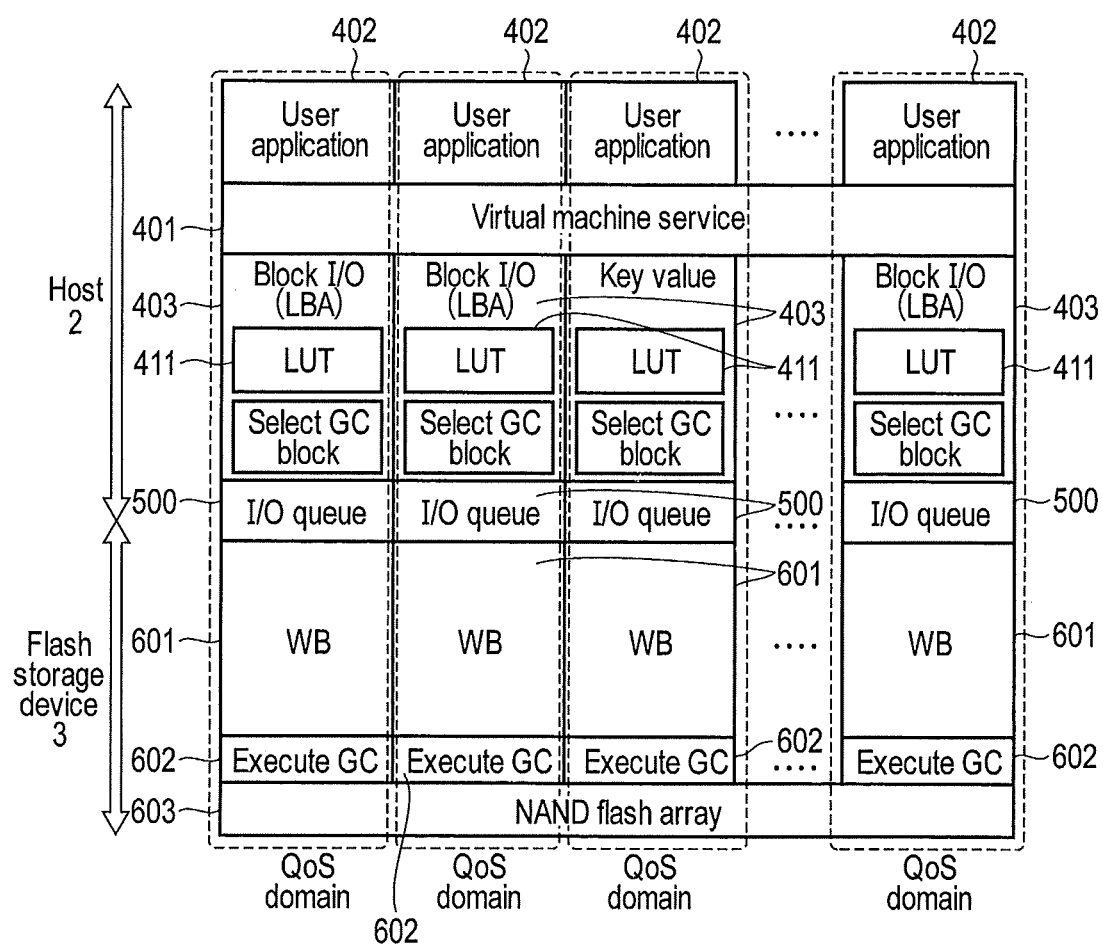
FIG. 2 is a diagram illustrating a role shared by a host and the memory system according to the embodiment.

Various embodiments will be described hereinafter with reference to the accompanying drawings.

In general, according to one embodiment, a memory system connectable to a host, comprises a nonvolatile memory including a plurality of blocks, and a controller electrically connected to the nonvolatile memory. In response to receiving from the host a write request that designates a first address for identifying data to be written, the controller encrypts the data with the first address and a first encryption key, and writes the encrypted data to the nonvolatile memory together with the first address.

In response to receiving from the host a read request that designates a physical address indicative of a physical storage location of the nonvolatile memory in which the encrypted data is stored, the controller reads both the encrypted data and the first address from the nonvolatile memory, on the basis of the physical address, and decrypts the read encrypted data with the first encryption key and the read first address.

First, a configuration of a computing system that includes a memory system according to one embodiment will be described with reference to FIG. 1.

The memory system is a semiconductor storage device configured to write data to a nonvolatile memory and to read data from the nonvolatile memory. The memory system is implemented as a flash storage device 3 based on a NAND flash technology.

The computing system may include a host (host device) 2 and plural flash storage devices 3. The host 2 may be a server configured to use a flash array composed of plural flash storage devices 3 as a storage. The host (server) 2 and the flash storage devices 3 are interconnected via an interface 50 (internal interconnection). The interface 50 for the internal interconnection is not limited, but may be PCI Express (PCIe) (registered trademark), NVM Express (NVMe) (registered trademark), Ethernet (registered trademark), NVMe over Fabrics (NVMeOF), and the like. An example of a server functioning as the host 2 is a server in a data center.

In a case where the host 2 is implemented as the server in the data center, the host (server) 2 may be connected to plural end user terminals (clients) 61 via a network 60. The host 2 can provide various services to the end user terminals 61.

Examples of the services which can be provided by the host (server) 2 are (1) Platform as a Service (PaaS) that provides a system running platform to each client (each end user terminal 61), (2) Infrastructure as a Service (IaaS) that provides an infrastructure such as a virtual server to each client (each end user terminal 61), and the like.

Plural virtual machines may be executed on a physical server which functions as the host (server) 2. Each of the virtual machines running on the host (server) 2 can function as a virtual server configured to provide various services to several corresponding clients (end user terminals 61).

The host (server) 2 has a storage management function of managing plural flash storage devices 3 constituting a flash array, and a front-end function of providing various services including a storage access to each of the end user terminals 61.

In a conventional SSD, a block/page hierarchical structure of a NAND flash memory is concealed by a flash translation layer (FTL) in the conventional SSD. In other words, FTL of the conventional SSD has (1) a function of managing mapping between each of the logic addresses and each of the physical addresses of the NAND flash memory, by using a lookup table which functions as a logical-to-physical address translation table, (2) a function of concealing read/write operations in a page unit and an erase operation in a block unit, (3) a function of executing a garbage collection (GC) of the NAND flash memory, and the like. Mapping between each of the logical addresses and each of the physical addresses of the NAND flash memory cannot be seen from the host. The block/page structure of the NAND flash memory cannot be seen from the host either.

A type of address translation (application-level address translation) is also executed in the host. This address translation manages mapping between each of the application-level logical addresses and each of the logical addresses for the SSD, by using the application-level address translation table. In addition, in the host, too, a type of GC (application-level GC) for change of data placement in the logical address space is executed for cancellation of a fragment which occurs in the logical address space for the SSD.

In such a redundant configuration in which each of the host and the SSD includes the address translation table (i.e., the SSD includes the lookup table functioning as the logical-to-physical address translation table whereas the host includes the application-level address translation table), enormous volumes of memory resources are used to store these address translation tables. Furthermore, double address translation including the address translation on the host side and the address translation on the SSD side might also be a factor which degrades I/O performance.

Moreover, the application-level GC on the host side becomes a factor which increases the amount of data written to the SSD to several times of the amount of actual user data. Such increase of the data write amount degrades the storage performance of the whole system and shortens the life of the SSD along with write amplification of SSD.

To solve such a problem, a measure of implementing all the functions of FTL of the conventional SSD to the host is considered.

To take this measure, however, the host needs to directly handle the blocks and pages of the NAND flash memory. In the NAND flash memory, the host can hardly handle the page directly due to restrictions on page write order. In addition, the block often includes a defective page (bad page) in the NAND flash memory. Handling the bad page is further difficult for the host.

Thus, in the present embodiment, the role of FTL is shared by the host 2 and the flash storage device 3. In general, for example, the host 2 may only designate a block address of a block to which data is to be written and the address (hereinafter referred to as a tag) for identifying the data, and the flash storage device 3 may determine a physical storage location (write destination location) in this block to which the data is to be written. A typical example of the tag is a logical address such as a logical block address (LBA). A key of a key-value store or a hash value of the key may be used as the tag.

Thus, the host 2 handles only a block, and a location in the block (for example, a page and a location in the page) is handled by the flash storage device 3.

When the host 2 needs to write data to the flash storage device 3, the host 2 selects a block address (or requests the flash storage device 3 to allocate a free block), and sends to the flash storage device 3 a write request (write command) designating (i) the tag such as LBA and (ii) the block address of the selected block (or the block address of the allocated block which is notified by the flash storage device 3). The flash storage device 3 writes the data from the host 2, to the block having the designated block address. In this case, the flash storage device 3 determines the location in the block (write destination location) and writes the data received from the host 2 to the location in the block (write destination location). Then, the flash storage device 3 notifies the host 2 of the in-block physical address indicative of the write destination location as a response (e.g., return value) to the write request. The in-block physical address is also called a block offset. The block offset may be represented by the page address and the offset in a page (page offset).

When the host 2 needs to read data from the flash storage device 3, the host 2 sends to the flash storage device 3 a read request (read command) to designate a physical address (block address and in-block physical address) indicative of a physical storage location in which the data is stored. The flash storage device 3 reads the data from the physical storage location in a certain block, indicated by the physical address included in the read request. In this case, the block from which the data is to be read is designated by the block address included in the read request, and the physical storage location in the block from which the data is to be read is designated by the in-block physical address included in the read request.

Thus, in the present embodiment, different addressing methods are employed between data write and data read. In other words, the address (tag such as LBA) to identify the data to be written and the block address are designated by the host 2 in the data write, and the physical address (block address and in-block physical address) indicative of the physical storage location where the data to be read is stored is designated by the host 2 in the data read.

Alternatively, for example, the host may designate only the tag to identify the data to be written, and the flash storage device 3 may determine both the block to which the data is to be written and the physical storage location (write destination location) in the block to which the data is to be written. In this case, too, different addressing methods are employed between the data write and the data read.

The host 2 has a function of executing a storage service, a garbage collection (GC) block selection function, a QoS control function, and the like. The QoS control function includes a function of determining the access unit for each QoS domain (or each block). The QoS domains are plural regions defined by logically dividing the NAND flash memory. Each of the plural blocks of the NAND flash memory may belong to any one of the regions. Each of the regions includes sets of blocks. The access unit is indicative of the minimum data size (grain) which the host 2 can write/read. The flash storage device 3 may support a single or a plurality of access units (grains). If the flash storage device 3 supports the plural access units, the host 2 can instruct the access units which should be used for each QoS domain (or each block) to the flash storage device 3.

The flash storage device 3 can execute low-level abstraction. The low-level abstraction is a function for abstraction of the NAND flash memory. The low-level abstraction includes a function of concealing a defective block (bad block) and a defective page (bad page), and a function of securing restrictions on page write order. The low-level abstraction also includes a GC execution function. The GC execution function copies valid data in a copy source block (GC source block) designated by the host 2 to a copy destination block (GC destination block) designated by the host 2. The GC execution function of the flash storage device 3 determines a location (copy destination location) in the GC destination block to which the valid data should be written, and copies the valid data in the GC source block to the copy destination location in the GC destination block.

Furthermore, the flash storage device 3 executes an encryption/decryption operation. The encryption/decryption operation includes an operation of encrypting data when the data is to be written to the NAND flash memory, and an operation of decrypting encrypted data when the encrypted data is read from the NAND flash memory.

The encryption/decryption operation encrypts data not only with an encryption key, but with both the encryption key and the address included in a write request. In a case of encrypting the data only with the encryption key, encryption results corresponding to two data portions including the same content (i.e., the same data pattern) are the same. In contrast, in a case of encrypting the data with the encryption key and the address, encryption results corresponding to two data portions are not the same even if each of the data portions including the same content (i.e., the same data pattern) is encrypted. Therefore, the encryption method of encrypting the data with the encryption key and the address can obtain higher security than that of encrypting the data only with the encryption key.

In the present embodiment, addressing methods differ between data write and data read as explained above. In other words, the write request from the host 2 designates the tag (for example, a logical address such as an LBA), which is the address identifying the write data, however, the read request from the host 2 designates a physical address indicative of the physical storage location where the data to be read is stored but does not designate the tag identifying the data.

Therefore, in the processing of decrypting data encrypted with the encryption key and the address (for example, the logical address such as LBA) for identifying the data, the encrypted data cannot be decrypted correctly if the physical address included in the read request received from the host 2 is used for the decryption processing.

For this reason, in the present embodiment, when the flash storage device 3 receives from the host 2 a write request to designate an address (tag) for identifying data to be written, the flash storage device 3 encrypts the data with the address and the encryption key (first encryption key) selected from plural encryption keys, and writes the encrypted data to a specific block of the NAND flash memory together with the address. In a case where the write request designates a block address, the specific block is a block having the block address designated by the write request.

Then, when the flash storage device 3 receives from the host 2 a read request to designate a physical address indicative of the physical storage location in the NAND flash memory where the encrypted data is stored, the flash storage device 3 reads both the encrypted data and the address from the specific block, on the basis of the physical address, and decrypts the read encrypted data with the first encryption key and the read address.

As a result, even in the configuration that different addressing methods are employed for the data write and the data read, data encrypted with an encryption key and the address (for example, logical address such as LBA) for identifying the data can be decrypted correctly with the address read from the NAND flash memory 5 (i.e., address written together with the encrypted data).

FIG. 2 illustrates a role shared by the flash storage device 3 and the host 2.

In the host (server) 2, a virtual machine service 401 for providing a plurality of virtual machines to a plurality of end users is executed. In each of the virtual machines on the virtual machine service 401, an operating system and user applications 402 used by the corresponding end users are executed.

In addition, in the host (server) 2, a plurality of I/O services 403 corresponding to the user applications 402 are executed. The I/O services 403 may include LBA-based block I/O service, key-value 403 includes a lookup table (LUT) 411 which manages mapping between each of the tags capable of identifying data to be accessed, and each of the physical addresses of the flash storage device 3.

In the LBA-based block I/O service, the LUT 411 which manages mapping between each of the logical addresses (LBAs) and each of the physical addresses of the flash storage device 3 may be used.

In the key-value store service, the LUT 411 which manages mapping between each of the keys (or each of hash values of the keys), and each of the physical addresses indicative of the physical storage locations in the flash storage device 3 where the data corresponding to each of the keys (or each of hash values of the keys) is stored, may be used.

Each of the end users can select an addressing method (e.g., an LBA, a key of the key-value store, or the like) to be used.

Each LUT 411 does not translate each of the tags (for example, LBA) from the user application 402 into the logical address for the flash storage device 3, but directly translates each of the tags (for example, LBA) from the user application 402 into each of the physical addresses of the flash storage device 3. In other words, each LUT 411 is a table in which the table for translation of the logical address for the flash storage device 3 into the physical address, and the above-explained application-level address translation table are integrated (merged).

In addition, each I/O service 403 includes a GC block selection function. The GC block selection function can manage a valid data amount of each block by using the corresponding LUT and can thereby select the GC source block.

In the host (server) 2, the I/O service 403 may be provided for each of the QoS domains. The I/O service 403 belonging to a certain QoS domain may manage mapping between each of the tags (for example, LBA) used by the user application 402 in the corresponding QoS domain and each of the block addresses of the plural blocks belonging to the resource group allocated to the corresponding QoS domain.

Transmission of the command from the host (server) 2 to the flash storage device 3 and return of a command completion response or the like from the flash storage device 3 to the host (server) 2 are executed via an I/O queue 500 which exists in each of the host (server) 2 and the flash storage devices 3. The I/O queues 500 may also be classified into a plurality of queue groups corresponding to the QoS domains.

The flash storage device 3 includes a plurality of write buffers (WB) 601 each corresponding to the QoS domains, a plurality of garbage collection (CC) functions 602 each corresponding to the QoS domains, and the NAND flash memories (NAND flash array) 603.

In the configuration illustrated in FIG. 2, since the upper layer (host 2) can recognize a block boundary, the upper layer can write user data to each block in consideration of the block boundary/block size. In other words, the host 2 can recognize each of the blocks of the NAND flash memory (NAND flash array) 603 and can thereby execute, for example, a control such as simultaneously writing data to one entire block or invalidating the entire data in one block by erasing (unmapping) or updating. As a result, a situation in which the valid data and the invalid data exist together in one block can be prevented from likely occurring. The frequency at which GC needs to be executed can be thus reduced. By reducing the frequency of GC, the write amplification can be lowered, the performance of the flash storage device 3 can be improved, and the life of the flash storage device 3 can be extended to a maximum. Thus, the configuration that the upper layer (host 2) can recognize the block address is useful.

In contrast, the location in a block to which data should be written is determined not by the upper layer (host 2), but by the flash storage device 3. Therefore, a defective page (bad page) can be concealed and the restrictions on page write order can be enforced.

Figure 3:
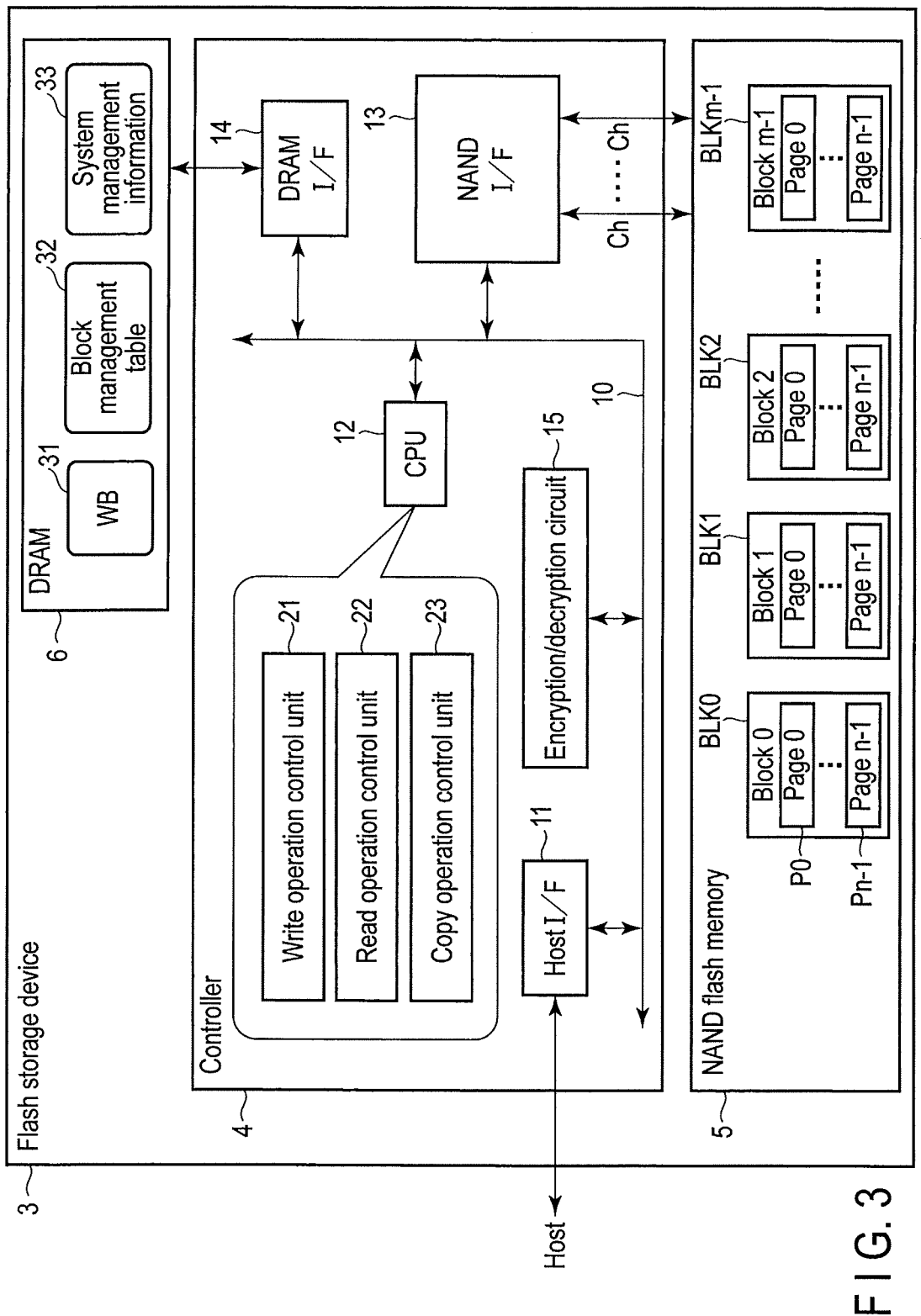
FIG. 3 is a block diagram illustrating a configuration example of the memory system according to the embodiment.

FIG. 3 illustrates a configuration example of the flash storage device 3.

The flash storage device 3 includes a controller 4 and a nonvolatile memory (NAND flash memory) 5. The flash storage device 3 may include a random access memory, for example, a DRAM 6.

The NAND flash memory 5 includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks (BLKs) 0 to m−1. Each of BLK0 to BLKm−1 includes plural pages (here, pages P0 to Pn−1). BLK0 to BLKm−1 each function as an erase unit. Blocks may be called erase blocks, physical blocks or physical erase blocks. Each of the pages P0 to Pn−1 includes a plurality of memory cells connected to the same word line. The pages P0 to Pn−1 each are a unit for a data write operation and a data read operation.

The controller 4 is electrically connected to the NAND flash memory 5, which is a nonvolatile memory, via a NAND interface 13 such as Toggle NAND flash interface or Open NAND Flash Interface (ONFI). The controller 4 is a memory controller (control circuit) configured to control the NAND flash memory 5.

As illustrated in FIG. 4, the NAND flash memory 5 may include a plurality of NAND flash memory chips (NAND flash memory dies). Each of the NAND flash memory chips can operate independently. For this reason, the NAND flash memory chips each function as a parallel operation unit. FIG. 4 illustrates a case where 16 channels Ch.1 to Ch.16 are connected to the NAND interface 13, and 2 NAND flash memory chips are connected to each of the 16 channels Ch.1 to Ch.16. In this case, 16 NAND flash memory chips #1 to #16 connected to channels Ch.1 to Ch.16 may be organized as bank #0. The other 16 NAND flash memory chips #17 to #32 connected to channels Ch.1 to Ch.16 may be organized as bank #1. The bank functions as a unit for operating a plurality of memory modules in parallel by bank interleaving. In the configuration example of FIG. 4, the parallel operation of 32 NAND flash memory chips is realized at a maximum by the 16 channels and bank interleaving with 2 banks.

In the present embodiments, the controller 4 may manage plural block groups (each block group hereinafter called a superblock). Each of the superblocks includes plural blocks BLK. The controller 4 may execute the erase operation in a unit of superblock.

The superblocks are not limited but may include a total of 32 blocks BLK selected from the NAND flash memory dies #1 to #32, respectively. Each of the NAND flash memory dies #1 to #32 may have a multiplane configuration. For example, if each of the NAND flash memory dies #1 to #32 has the multiplane configuration including two planes, one superblock may include a total of 64 blocks BLK selected from 64 planes corresponding to the NAND flash memory dies #1 to #32, respectively.

FIG. 5 illustrates an example of a single super block SB that includes 32 blocks (block BLK2 in NAND flash memory chip #1, block BLK3 in NAND flash memory chip #2, block BLK7 in NAND flash memory chip #3, block BLK4 in NAND flash memory chip #4, block BLK6 in NAND flash memory chip #5, . . . , block BLK3 in NAND flash memory chip #32).

One block designated by the block address included in a write request may be a super block that includes a set of blocks (physical blocks) which can be accessed in parallel, or may be a physical block. Each superblock may include only one physical block. In this case, a single superblock is equivalent to a single physical block.

As illustrated in FIG. 3, the controller 4 includes a host interface 11, a CPU 12, a NAND interface 13, a DRAM interface 14, an encryption/decryption circuit 15, and the like. The host interface 11, the CPU 12, the NAND interface 13, the DRAM interface 14, and the encryption/decryption circuit 15 are interconnected via the bus 10.

The host interface 11 is a host interface circuit configured to communicate with the host 2. The host interface 11 may be, for example, a PCIe/NVMe controller. The host interface 11 receives various requests (commands) from the host 2. The requests (commands) include a write request (write command), a read request (read command), and the other various requests.

The CPU 12 is a processor configured to control the host interface 11, the NAND interface 13, the DRAM interface 14, and the encryption/decryption circuit 15. The CPU 12 loads a control program (firmware) from the NAND flash memory 5 or a ROM (not shown) to the DRAM 6 upon power-on of the flash storage device 3 and executes various processing by executing the firmware. The firmware may be loaded into an SRAM in the controller 4, which is not illustrated in the drawings. The CPU 12 can execute command processing for processing various commands from the host 2. Operations of the CPU 12 can be controlled by the above-described firmware executed by the CPU 12. A part or all the command processing may be executed by dedicated hardware in the controller 4.

The CPU 12 can function as a write operation control unit 21, a read operation control unit 22, and a copy operation control unit 23. Several or all parts of each of the write operation control unit 21, the read operation control unit 22, and the copy operation control unit 23 may also be implemented by dedicated hardware in the controller 4.

In the following descriptions, a configuration that the host 2 designates a block address of a block to which data is to be written and a tag (for example, an LBA) which is the address for identifying the data, and the flash storage device 3 determines the physical storage location (write destination location) in this block to which the data is to be written, will be explained as an example. Operations of the write operation control unit 21, the read operation control unit 22, and a copy operation control unit 23 will also be explained in the following description.

The write operation control unit 21 receives a write request (write command) designating a block address and a tag (LBA) from the host 2. The tag is an address capable of identifying data (user data) to be written and may be, for example, an LBA, a key of a key-value store, or a hash value of the key. The block address is a block identifier designating a block to which the data is to be written. Various values that can uniquely identify any one of the blocks can be used as the block address. For example, the block address may be represented by a combination of a chip address and a block address. The block designated by the block address may be a physical block or a super block.

The write command may further designate a region ID. More specifically, the controller 4 manages plural regions defined by logically dividing the NAND flash memory 5. Each of the regions includes several blocks. The region ID is an identifier which designates a region of the plural regions. One region may be allocated to each end user (tenant). In this case, read/write requests from the user application corresponding to each end user (tenant) may include a region ID indicative of a region used by the end user (tenant).

In the present embodiment, plural encryption keys for encrypting data (user data) received from the host 2 are managed in the controller 4.

Encryption of the data (user data) may be executed using different encryption keys for different regions, i.e., a different encryption key for each tenant. In other words, the controller 4 includes a management table to manage correspondence between the plural regions and the plural encryption keys. In a case of receiving a read/write request to designate a certain region ID from the host 2, the controller 4 selects an encryption key associated with the region indicated by the region ID as an encryption key to be used for the data encryption (or decryption).

Since the information indicative of correspondence between the regions and the blocks belonging to the respective regions is managed by the controller 4, the controller 4 can also select the encryption key corresponding to the region to which the block having the block address designated by the read/write request belongs, as the encryption key to be used for the data encryption (decryption). Thus, read/write requests including no region ID can also be used in the present embodiment.

The plural regions may be implemented as plural QoS domains. The individual QoS domains are identified by identifiers of the QoS domains (QoS domain ID). In a case where the plural regions are implemented as plural QoS domains, each read/write request may include or may not include the QoS domain ID as the region ID. If each read/write request includes the QoS domain ID, the controller 4 can select the encryption key associated with the region (QoS domain) indicated by the QoS domain ID designated in the read/write request received from the host 2, as an encryption key to be used for the data encryption (or decryption). If each read/write request does not include the QoS domain ID, the controller 4 can select an encryption key associated with the region (QoS domain) to which a block having a designated block address belongs, as the encryption key to be used for the data encryption (decryption), on the basis of the block address designated in the read/write request received from the host 2.

Alternatively, the plural regions may be implemented as plural namespaces. Each of the namespaces is a region (storage region) in the NAND flash memory 5, and a logical address space (LBA range) is allocated to each of the namespaces. The individual namespaces are identified by identifiers of the namespaces (namespace IDs: NSIDs). LBA ranges (LBA0 to LBAn−1) are allocated to each region. The size of the LBA range (that is, the number of LBAs) is variable for each region (each namespace). Each LBA range starts with LBA0. In a case where the plural regions are implemented as plural namespaces, each read/write request may include or may not include the namespace ID as the region ID. If each read/write request includes the namespace ID, the controller 4 can select an encryption key associated with the region (namespace) indicated by the namespace ID designated in the read/write request received from the host 2, as the encryption key to be used for the data encryption (or decryption). If each read/write request does not include the namespace ID, the controller 4 can select an encryption key associated with the region (namespace) to which a block having a designated block address belongs, as the encryption key to be used for the data encryption (or decryption), on the basis of the block address designated in the read/write request received from the host 2.

Alternatively, each block may be used as the region. In this case, in general, encryption of data (user data) may be executed using different encryption keys for different blocks. The controller 4 can also select the encryption key associated with a block having a designated block address, as an encryption key to be used for the data encryption (or decryption), on the basis of the block address designated in the read/write request received from the host 2.

Alternatively, the plural regions with which the plural encryption keys are associated respectively may be implemented as plural LBA ranges, respectively. If a write request designating an address (tag) indicative of certain LBA is received, an encryption key corresponding to the LEA range to which the LBA belongs is selected as an encryption key to be used for encryption of the data associated with the write request.

When the write operation control unit 21 receives a write request (write command) designating a block address and a tag (LBA) from the host 2, the write operation control unit 21 first determines a location (write destination location) in a block (write destination block) having the designated block address to which data from the host 2 is to be written. Then, the write operation control unit 21 encrypts the data (write data) from the host 2 with the tag (LBA) and an encryption key selected from the plural encryption keys. In this case, the operation for encrypting the data is executed using the encryption/decryption circuit 15. The encryption key selected from the plural encryption keys may be an encryption key associated with the block or the region to which the block belongs.

Then, the write operation control unit 21 writes the encrypted data to the block (write destination block) together with the tag (LBA). In this case, the encrypted data is written to the determined location (write destination location) in the write destination block, and the tag (LBA) may be written into the same page as the page to which the write destination location belongs.

The read operation control unit 22 receives from the host 2 a read request (read command) designating a physical address indicative of a physical storage location in the NAND flash memory 5 where encrypted data is stored. The physical address is represented by a block address of the block where the above-explained encrypted data is stored, and an in-block physical address (block offset) indicative of a location (physical storage location) in the block where the encrypted data is stored. The block offset is indicative of an offset from the beginning of this block to the physical storage location. This block offset may be represented by a page address and a page offset.

Alternatively, the block offset may be represented by a multiple of granularity (grain) having a predetermined size. The grain may have a size smaller than the page size. For example, if the page is 16K bytes, the size of the grain may be 4K bytes. In this case, a plurality of offset locations each having the size of 4K bytes are defined in a certain block. The block offset corresponding to the first offset location in the block is, for example, zero, the block offset corresponding to the subsequent offset location in the block is, for example, one, and the block offset corresponding to the further subsequent offset location in the block is, for example, two.

When a read request (read command) is received from the host 2, the read operation control unit 22 reads both the encrypted data and the tag (LBA) from the block, on the basis of a the physical address designated in the read request, and decrypts the read encrypted data with the encryption key associated with the block or a region to which the block belongs, and the read tag (LBA). In this case, the operation to decrypt the data is executed by the encryption/decryption circuit 15.

The copy operation control unit 23 executes an operation of copying encrypted data from a copy source block to a copy destination block. The copy operation may be an operation of simply copying a specified encrypted data alone from the copy source block to the copy destination block, an operation of copying only the valid encrypted data in the copy source block to the copy destination block for garbage collection, or an operation of copying all the encrypted data in the copy source block to the copy destination block for wear leveling. In the copy operation, the copy operation control unit 23 copies both the encrypted data and the tag (LBA) corresponding to the encrypted data from the copy source block to the copy destination block, without decrypting or re-encrypting the encrypted data.

In a case where the controller 4 manages a table for managing correspondence between plural blocks and plural encryption keys, the copy operation control unit 23 copies both the encrypted data and the tag (LBA) corresponding to the encrypted data from the copy source block to the copy destination block, and updates the table to associate the encryption key that has been associated with the copy source block, with the copy destination block.

In a case where the controller 4 manages a table for managing correspondence between plural blocks and plural encryption keys and the copy source block and copy destination block belong to the same region, the copy operation control unit 23 may copy both the encrypted data and the tag (LBA) corresponding to the encrypted data from the copy source block to the copy destination block, without decrypting or re-encrypting the encrypted data and updating the table.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 functions as the write buffer (WB) 31. In addition, the other part of the storage region in the DRAM 6 is used to store a block management table 32 and system management information 33.

The block management table 32 is used for management of valid data/invalid data. The block management table 32 may exist, for example, for each of the blocks. In the block management table 32 corresponding to a certain block, a bit map flag indicating validity/invalidity of each of the data in this block is stored. The valid data as used herein means data which is referred to from the LUT 411 of the host 2 (i.e., data linked to the tag (LBA) as the latest data) and which may be read later by the host 2. The invalid data means data which no longer has a possibility of being read from the host 2. For example, data associated with a certain tag (LBA) is valid data, and data associated with no tag (LBA) is invalid data.

The system management information 33 includes a table to manage correspondence between each of the regions and each of the block addresses, a table to manage correspondence between each of the regions (or blocks) and each of the encryption keys, and the like.

The write buffer (WB) 31, the block management table 32, and the system management information 33 may be stored in an SRAM (not shown) in the controller 4.

FIG. 6 illustrates an outline of a block allocate operation, a data write operation, a data read operation, and a data copy operation together with a flow of data, tag (LBA), block address, page address, and QoS domain ID.

<Block Allocate Operation>

When the host 2 needs a new free block to write data, the host 2 may require allocation of a free block of the flash storage device 3. In this case, the host 2 sends a block allocate request including a region ID such as QoS domain ID to the flash storage device 3.

In the controller 4 of the flash storage device 3, the write operation control unit 21 manages each of the free blocks of the NAND flash memory 5. When the write operation control unit 21 receives the block allocate request from the host 2, the write operation control unit 21 allocates one of the free blocks to the host 2. In addition, the write operation control unit 21 associates a block address of the free block allocated to the host 2 with the QoS domain ID included in the block allocate request. Then, the write operation control unit 21 notifies the host 2 of the block address of the allocated block together with the QoS domain ID.

The host 2 can acquire the block address (i.e., the block address of the allocated free block).

In the configuration that the host 2 manages each of the free blocks, the host 2 does not need to send the block allocate request to the flash storage device 3 since the host 2 can select one of the free blocks by itself.

<Data Write Operation>

The host 2 sends to the flash storage device 3 a write request which designates both a tag (for example, logical address (LBA)) for identifying write data and a block address (BLK #) of a write destination block.

The encryption/decryption circuit 15 encrypts the write data with the tag (LBA) included in the write request and an encryption key selected from the plural encryption keys stored in an encryption key storage region 80. The encryption key storage region 80 includes an encryption key management table where the plural encryption keys are stored. The plural encryption keys associated with respective plural regions (for example, plural QoS domains, plural namespaces, or plural LBA ranges) may be stored or the plural encryption keys associated with respective plural block addresses may be stored in the encryption key management table of the encryption key storage region 80.

If the plural encryption keys associated with the respective plural regions such as the QoS domains or the namespaces are stored in the encryption key management table of the encryption key storage region 80, an encryption key associated with the region (QoS domain or namespace) to which a block having a block address included in the write request belongs may be selected from the plural encryption keys. If the write request includes the QoS domain ID or the namespace ID, an encryption key associated with the region (QoS domain or namespace) designated by the QoS domain ID or the namespace ID may be selected from the plural encryption keys.

If the plural encryption keys associated with the respective plural LBA ranges are stored in the encryption key management table of the encryption key storage region 80, an encryption key associated with the LBA range to which the tag (LBA) included in the write request belongs may be selected from the plural encryption keys.

If the plural encryption keys associated with respective plural block addresses are stored in the encryption key management table of the encryption key storage region 80, an encryption key associated with the block address included in the write request may be selected from the plural encryption keys.

The write operation control unit 21 determines a block offset (simply referred to as an offset) indicative of a write destination location in the block (write destination block) having the block address designated in the write request. The write destination location is a location in the write destination block to which the encrypted data is to be written. The block offset can be represented by a page address and a page offset, but the block offset in FIG. 6 is represented by the page address alone to simplify the illustration.

The write operation control unit 21 writes the encrypted write data to the write destination location in the write destination block, together with the tag (LBA) included in the write request, on the basis of the block address designated in the write request and the block offset (page address).

In data write operation, the write operation control unit 21 may perform the following operations.

The write operation control unit 21 receives a write request and write data from the host 2, sends the received write data and the tag (LBA) included in the received write request, to the encryption/decryption circuit 15, selects, from the encryption key storage region 80, the encryption key corresponding to the region ID, the block address, or the tag (LBA) included in the received write request, and sends the selected encryption key to the encryption/decryption circuit 15.

Next, the write operation control unit 21 may notify the host 2 of a set of the tag (LBA) corresponding to the write data, the block address of the write destination block, and the block offset (page address) indicative of the write destination location, as a response to the write request. Alternatively, the write operation control unit 21 may notify the host 2 of the block offset indicative of the write destination location as a response to the write request.

The host 2 includes a flash translation unit 52 which manages LUT 411. The flash translation unit 52 manages LUT 411, i.e., the address translation table to manage the mapping between each of tags (for example, LBA) and each of the physical addresses of the NAND flash memory 5. When the flash storage device 3 notifies the flash translation unit 52 of the block address, the block offset (page address), and the tag (for example, LBA), the flash translation unit 52 updates LUT 411, and maps the notified physical address (block address and block offset (page address)) to the notified tag. The flash translation unit 52 can translate the tag included in a read request from host software (user application) into the physical address (block address and block offset (page address)) by referring to LUT 411, and can thereby send the read request (read command) including the physical address to the flash storage device 3.

<Data Read Operation>

When the host 2 needs to read data from the flash storage device 3, the host 2 acquires a physical address (block address or block offset (page address)) corresponding to a tag (LBA) of the data to be read, from LUT 411, by referring to LUT 411.

Then, the host 2 sends a read request for designating the acquired block address and the block offset (page address) to the flash storage device 3. When the controller 4 (more specifically, read operation control unit 22) of the flash storage device 3 receives the read request from the host 2, the controller 4 specifies a read target block and a read target physical storage location in the read target block, on the basis of the block address and the block offset (page address), and reads both encrypted data and the tag (LBA) corresponding to the encrypted data from the read target physical storage location in the read target block.

Next, the read encrypted data is decrypted by the encryption/decryption circuit 15. The encryption/decryption circuit 15 decrypts the read encrypted data with the read tag (LBA) and the encryption key associated with the read target block (or the encryption key associated with the region to which the read target block belongs, or the encryption key associated with the LBA range to which the read tag (LBA) belongs). Then, the controller 4 sends the decrypted data to the host 2.

<Data Copy Operation>

The copy operation control unit 23 reads data in a certain block (copy source block) and writes the data to another block (copy destination block). In this case, the copy operation control unit 23 reads both encrypted data and a tag (LBA) corresponding to the encrypted data from the copy source block, and writes (copies) both the encrypted data and the tag (LBA) to the copy destination block. The encrypted data is copied from the copy source block to the copy destination block without being decrypted or re-encrypted. In processing of decrypting this encrypted data which is read from the copy destination block, the tag (LBA) read from the copy destination block together with the encrypted data, and the same encryption key as the encryption key associated with the copy source block will be used.

Figure 7:
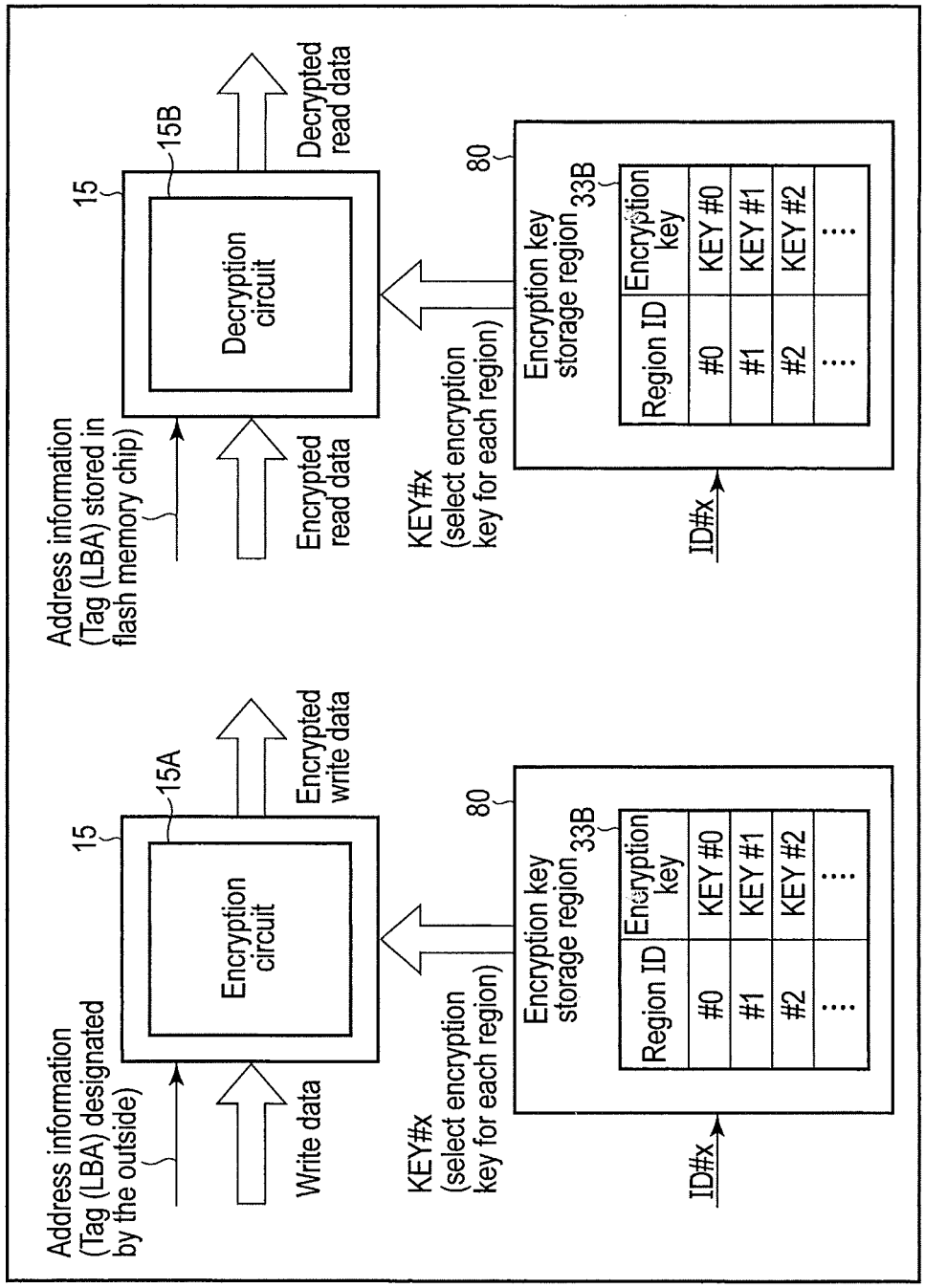
FIG. 7 is a diagram illustrating data encryption and decryption operations executed in the memory system according to the embodiment.

FIG. 7 illustrates encryption and decryption operations executed in the encryption/decryption circuit 15.

As illustrated in the left part of FIG. 7, when a decryption circuit 15A in the encryption/decryption circuit 15 receives write data to be encrypted, the address information, and the encryption key, the decryption circuit 15A encrypts the write data with the address information and the encryption key and outputs the encrypted write data. The address information is a tag (LBA) included in a write request received from the host 2. The write data and the address information may be sent from the write operation control unit 21 to the encryption circuit 15A.

An encryption key management table 33B of the encryption key storage region 80 stores plural encryption keys (KEY #0, KEY #1, KEY2, . . . ) associated with plural region IDs (#0, #1, #2, . . . ), respectively. When a certain region ID (ID #x) is provided from the write operation control unit 21 to the encryption key storage region 80, the encryption key management table 33B of the encryption key storage region 80 outputs an encryption key (KEY #x) corresponding to the certain region ID (ID #x). The encryption key (KEY #x) output from the encryption key storage region 80 is sent to the encryption circuit 15A of the encryption/decryption circuit 15.

Processing of encrypting write data with address information and an encryption key can be executed in various methods. For example, an encryption algorithm conforming to AES-XTS or other encryption algorithms may be used.

For example, in the processing of encrypting the write data with the address information and the encryption key, the encryption circuit 15A first may change a bit pattern of the write data with the address information (LBA), and may encrypt the changed bit pattern with the encryption key. In the processing of changing the bit pattern of the write data with the address information (LBA), the encryption circuit 15A may first encrypt the address information with an encryption key different from the encryption key for data and then may change the bit pattern of the write data with the encrypted address information.

As illustrated in the right part of FIG. 7, when a decryption circuit 15B in the encryption/decryption circuit 15 receives encrypted read data, the address information, and the encryption key, the decryption circuit 15B decrypts the encrypted read data with the address information and the encryption key and outputs the decrypted read data. The encrypted read data provided to the encryption/decryption circuit 15 is encrypted data which is read from the NAND flash memory 5 by the read operation control unit 22. The address information provided to the encryption/decryption circuit 15 is not the address information (physical address) included in a read request received from the host 2, but the tag (LBA) which is read from the NAND flash memory 5 by the read operation control unit 22 together with the encrypted data. The encrypted read data and address information may be sent from the read operation control unit 22 to the decryption circuit 15B.

As explained above, the encryption key management table 33B of the encryption key storage region 80 stores plural encryption keys (KEY #0, KEY #1, KEY2, . . . ) associated with plural region IDs (#0, #1, #2, . . . ), respectively. When a certain region ID (ID #x) is provided from the read operation control unit 22 to the encryption key storage region 80, the encryption key management table 33B of the encryption key storage region 80 outputs an encryption key (KEY #x) corresponding to the certain region ID (ID #x). The encryption key (KEY #x) output from the encryption key storage region 80 is sent to the decryption circuit 15B of the encryption/decryption circuit 15.

In the processing of decrypting the encrypted read data, the decryption circuit 15B may first change a bit pattern of the encrypted read data with the address information (LBA), and may decrypt the changed bit pattern with the encryption key.

FIG. 8 illustrates block allocate processing executed in response to a block allocate command.

The controller 4 of the flash storage device 3 manages a set of free blocks with a free block list. The free blocks mean blocks storing no valid data. FIG. 8 illustrates a case where block BLK #x, block BLK #x+1, block BLK #x+2, . . . are included in the free block list.

The host 2 sends a block allocate command including certain QoS domain ID (QoS domain ID #0 in this case) to the flash storage device 3. The controller 4 of the flash storage device 3 selects any free block (block BLK #x in this case) from the free blocks managed by the free block list, and allocates the selected free block (block BLK #x) as an available write destination block for host 2. In this case, the controller 4 notifies the host 2 of the block address of the free block (block BLK #x).

The controller 4 manages information indicative of correspondence between the blocks and the QoS domains to which the blocks belong. FIG. 8 illustrates a case where block BLK #0, block BLK #1, block BLK #2, block BLK #3, and block BLK #4 belong to QoS domain #0 (QoS domain of QoS domain ID #0), and block BLK #5, block BLK #6, block BLK #7, and block BLK #8 belong to QoS domain #1 (QoS domain of QoS domain ID #1). When block BLK #x is allocated to the host 2 in response to the block allocate command including QoS domain ID #0, the controller 4 associates block BLK #x with QoS domain #0 such that block BLK #x belongs to QoS domain #0.

FIG. 9 illustrates a QoS domain/block management table included in the system management information of FIG. 3.

A QoS domain/block management table 33A includes plural entries corresponding to the plural QoS domains. Each of the entries includes a QoS domain ID field and a block address field. The QoS domain ID field is indicative of specific QoS domain ID, the block address field is indicative of a list of block addresses of blocks belonging to the QoS domains having the specific QoS domain ID.

FIG. 9 illustrates an example that block BLK #0, block BLK #1, block BLK #2, block BLK #3, block BLK #4, and block BLK #x belong to the QoS domain of QoS domain ID #0; that block BLK #5, block BLK #6, block BLK #7, and block BLK #8 belong to the QoS domain of QoS domain ID #1; that block BLK #9, block BLK #12, and block BLK #15 belong to the QoS domain of QoS domain ID #2; that block BLK #10, block BLK #14, and block BLK #18 belong to the QoS domain of QoS domain ID #3; that block BLK #11, block BLK #16, and block BLK #21 belong to the QoS domain of QoS domain ID #4; and that block BLK #31 and block BLK #32 belong to the QoS domain of QoS domain ID #k.

FIG. 10 illustrates a QoS domain/encryption key management table.

A QoS domain/encryption key management table 33B' can be used as the encryption key management table 33B included in the encryption key storage region 80 illustrated in FIG. 7. In the QoS domain/encryption key management table 33B', encryption key KEY #0, encryption key KEY #1, encryption key KEY #2, encryption key KEY #3, encryption key KEY #4, . . . , and encryption key KEY #k corresponding to QoS domain ID #0, QoS domain ID #1, QoS domain ID #2, QoS domain ID #3, QoS domain ID #4, . . . , and QoS domain ID #k, respectively, are managed. In a case where the QoS domain/encryption key management table 33B' is used as the encryption key management table 33B included in the encryption key storage region 80 illustrated in FIG. 7, a different encryption key can be used for each QoS domain. Since different QoS domains are allocated to end users (tenants) using the host (server) 2, different encryption keys can be used for the respective end users (tenants) by the configuration of using different encryption keys for the respective QoS domains.

FIG. 11 illustrates a block/encryption key management table.

A block/encryption key management table 33C is used as the encryption key management table 33B included in the encryption key storage region 80 illustrated in FIG. 7. Encryption keys KEY #0, KEY #1, KEY #2, KEY #3, KEY #4, . . . corresponding to block addresses BLK #0, BLK #1, BLK #2, BLK #3, BLK #4, . . . , respectively, are managed in the block/encryption key management table 33C. In a case where the block/encryption key management table 33C is used as the encryption key management table 33B included in the encryption key storage region 80 illustrated in FIG. 7, an encryption key corresponding to a block address included in a write/read request can be selected from the plural encryption keys included in the encryption key storage region 80.

FIG. 12 illustrates a sequence of encryption key change processing executed in the host 2 and the flash storage device 3.

It is assumed that the QoS domain/encryption key management table 33B' illustrated in FIG. 10 is used as the encryption key management table 33B included in the encryption key storage region 80 illustrated in FIG. 7.

The host 2 can request the flash storage device 3 to change an encryption key as needed. In this case, the host 2 sends the encryption key change command including a specified QoS domain ID to the flash storage device 3.

When the controller 4 of the flash storage device 3 receives the encryption key change command from the host 2, the controller 4 changes the encryption key for the QoS domain corresponding to the specified QoS domain ID designated in the encryption key change command (step S11). Then, the controller 4 updates the QoS domain/encryption key management table 33B' and associates the changed encryption key with the specified QoS domain ID (step S12).

Figure 13:
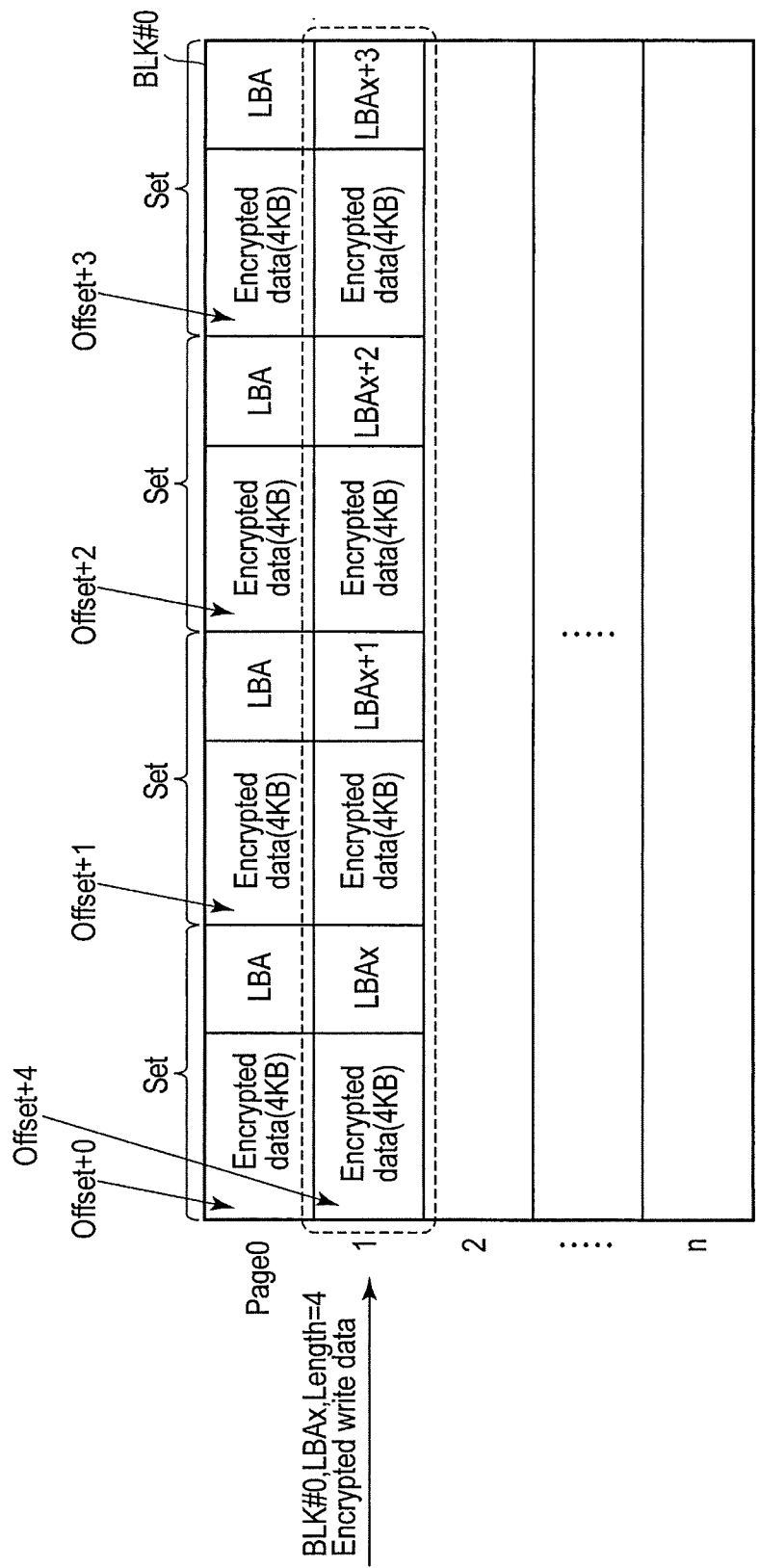
FIG. 13 is a diagram illustrating a write operation executed in response to a write command.

FIG. 13 illustrates a write operation executed in response to a write command.

In the present embodiment, encrypted data is written to a block together with the tag (LBA) corresponding to the encrypted data. In this case, both the encrypted data and the tag (LBA) may be written to the same page in the same block or may be written to different pages in the same block. The physical storage location in the block where the tag (LBA) corresponding to certain encrypted data is to be written may be, for example, a physical storage location which can be specified by a simple operation alone from the physical storage location where the encrypted data is written, or a physical storage location adjacent to the physical storage location where the encrypted data is written.

FIG. 13 illustrates a case of writing both the encrypted data and the tag (LBA) corresponding to the encrypted data to the same page in the same block (block BLK #0 in this case). Each of the pages of block BLK #0 may include a user data region for storing user data and a redundant region for storing management data. The page size is 16 KB+α.

The tag (LBA) may be written to block BLK #0 for each user data having a predetermined size. FIG. 13 illustrates a case of writing the tag (LBA) to BLOCK #0 for each 4 KB user data. In this case, as illustrated in FIG. 13, four data sets may be written to the same page. Each data set includes LBA and the 4 KB user data (encrypted data). In the case of writing a pair (data set) of the 4 KB user data (encrypted data) and the tag (LBA) corresponding to the 4 KB user data in the format illustrated in FIG. 13 to block BLK #0, the block offset may be indicative of a boundary between data sets. The data in a 4 KB region at a first part of each data set is the encrypted data, and information in the other region of each data set is the LBA corresponding to the encrypted data.

It is assumed that a write command designating the block address (=BLK #0), the tag (LBAx), and the length (=4) is received from the host 2 in a state in which four 4 KB user data (encrypted data) and four LBAs have been written to page 0 of block BLK #0.

The controller 4 determines page 1 of block BLK #0 as a write destination location. The controller 4 encrypts 16 KB write data (user data) received from the host 2 with an encryption key and LBAx. LBAx may be incremented in a predetermined size unit in processing of encrypting 16 KB write data. For example, the first 4 KB user data in 16 KB write data may be encrypted with the encryption key and LBAx, the second 4 KB user data in 16 KB write data may be encrypted with the encryption key and LBAx+1, the third 4 KB user data in 16 KB write data may be encrypted with the encryption key and LBAx+2, and the fourth 4 KB user data in 16 KB write data may be encrypted with the encryption key and LBAx+3.

In the processing of encrypting 16 KB write data, the 16 KB write data and LBAx are provided to the encryption circuit 15A. The encryption circuit 15A may automatically increment LBA to be used for data encryption by +1 in a unit of a predetermined data size (for example, a unit of 4 KB).

Then, the controller 4 writes four pairs, i.e., a pair of first encrypted 4 KB user data and LBAx, a pair of second encrypted 4 KB user data and LBAx+1, a pair of third encrypted 4 KB user data and LBAx+2, and a pair of fourth encrypted 4 KB user data and LBAx+3, to page 1 of block BLK #0.

Alternatively, as illustrated in FIG. 14, four encrypted 4 KB user data may be written to user data areas in the page, and four LBAs (i.e., LBAx, LBAx+1, LBAx+2, and LBAx+3) corresponding to these four encrypted 4 KB user data may be written to redundant areas in this page.

Only one pair of encrypted 16 KB user data and LBAx may be written to page 1 of block BLK #0.

In addition, if four write commands that request the write of 4 KB data (length=1) are received from the host 2 and the write commands designate LBA10, LBA20, LBA100, and LBA200, respectively, a pair of LBA10 and encrypted 4 KB data corresponding to the first write command, a pair of LBA20 and encrypted 4 KB data corresponding to the second write command, a pair of LBA100 and encrypted 4 KB data corresponding to the third write command, and a pair of LBA200 and encrypted 4 KB data corresponding to the fourth write command are written to page 1 of block BLK #0.

FIG. 15 and FIG. 16 illustrate a read operation executed in the flash storage device 3.

In FIG. 15 and FIG. 16, it is assumed that a read command designating the block address (BLK #0), offset (=+4), and the length (=1) is received from the host 2. The controller 4 of the flash storage device 3 reads both first 4 KB user data (encrypted data) stored in page 1 of block BLK #0 and LBAx corresponding to the 4 KB user data, on the basis of the block address (BLK #0), offset (=+4), and the length (=1). In this case, the controller 4 reads data for one page size from page 1 of BLK #0 and extracts the first 4 KB user data and LBAx corresponding to the 4 KB user data from the read data. Next, the controller 4 sends the extracted 4 KB user data and LBAx to the decryption circuit 15B.

FIG. 17 illustrates a sequence of write operation processing executed in the host 2 and the flash storage device 3.

It is assumed that the QoS domain/encryption key management table 33B' illustrated in FIG. 10 is used as the encryption key management table 33B included in the encryption key storage region 80 illustrated in FIG. 7.

The host 2 first selects a block (free block) which should be used for writing by itself or requests the flash storage device 3 to allocate a free block by transmitting a block allocate command to the flash storage device 3. Then, the host 2 sends to the flash storage device 3 a write command including a block address of the block selected by itself (or a block address of the free block allocated by the flash storage device 3), a tag (LBA), and a length (step S21).

When the controller 4 of the flash storage device 3 receives the write command, the controller 4 specifies the QoS domain to which a block having the block address designated by the write command belongs (step S31). Next, the controller 4 encrypts write data associated with the write command, with the tag (LBA) included in the write command and an encryption key corresponding to the specified QoS domain (step S32).

The controller 4 selects a write destination block, on the basis of the block address designated in the write command (step S33). In step S33, the block having the designated block address is selected as the write destination block. The controller 4 writes the tag (LBA) in plain text to the selected write destination block together with the encrypted write data (step S34). The tag (LBA) in plain text is an LBA included in the write command. In step S34, if the write data has a length which is a multiple of the grain, plural tags (LBAs) corresponding to the respective plural 4 KB data units that constitute the write data may be written to the write destination block as illustrated in FIG. 13 and FIG. 14.

The controller 4 updates the block management table 32 corresponding to the write destination block, and changes a bit map flag corresponding to the written data (i.e., a bit map flag corresponding to the offset (block offset) to which the data is written) from 0 to 1 (step S35).

Figures 19, 20:
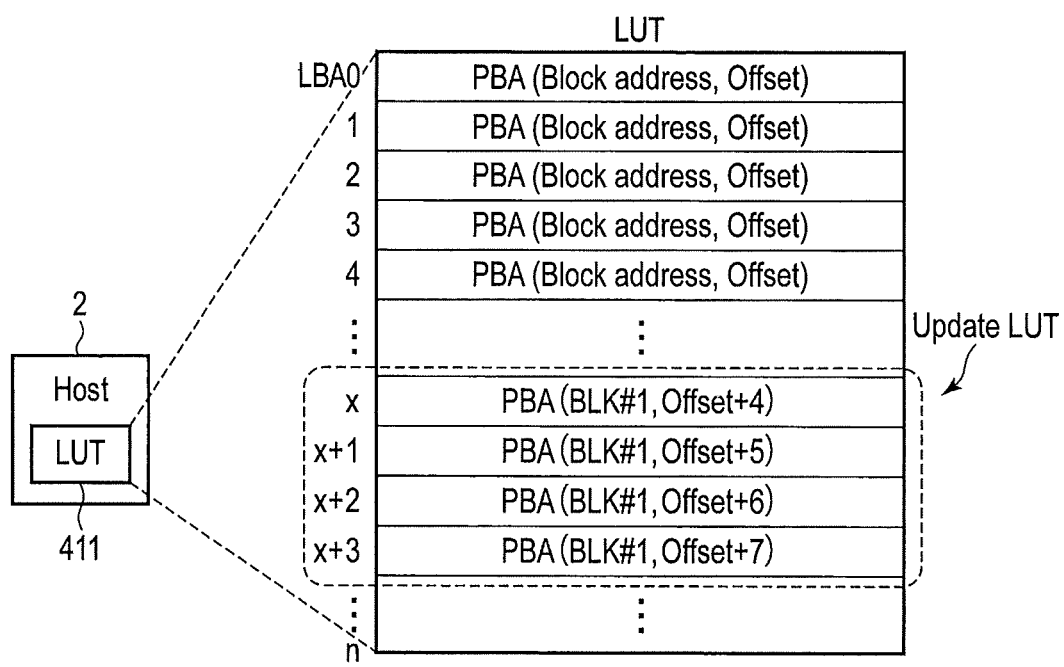
FIG. 19 is a diagram illustrating an operation of updating a block management table managed in the memory system according to the embodiments.
FIG. 20 is a diagram illustrating an operation of updating a lookup table (logical-to-physical address translation table) managed in the host.

It is assumed that, for example, 16 KB update data of which start LBA is LBAx are written to four physical storage locations corresponding to offsets +4 to +7 of block BLK #1 as shown in FIG. 18. In this case, as shown in FIG. 19, each of the bit map flags corresponding to offsets +4 to +7 is changed from 0 to 1 in the block management table for block BLK #1.

Then, the controller 4 returns a response to the write command to the host 2 (step S36 in FIG. 17). This response includes at least the offset (block offset) to which the data is written.

When the host 2 receives this response, the host 2 updates LUT 411 managed in the host 2 and maps the physical address to each tag (LBA) corresponding to the written write data (step S22). As illustrated in FIG. 20, LUT 411 includes plural entries corresponding to respective logical addresses (for example, LBA). In an entry corresponding to a certain LBA, a physical address PBA indicative of the location (physical storage location) in the NAND flash memory 5 in which data corresponding to the LBA is stored, i.e., the block address and the offset (in-block offset) are stored. As illustrated in FIG. 18, if the 16 KB update data of which starting LBA is LBAx are written to the physical storage locations corresponding to offsets +4 to +7 of block BLK #1, LUT 411 is updated, so that BLK #1 and offset +4 are stored in the entry corresponding to LBAx, BLK #1 and offset +5 are stored in the entry corresponding to LBAx+1, BLK #1 and offset +6 are stored in the entry corresponding to LBAx+2, and BLK #1 and offset +7 are stored in the entry corresponding to LBAx+3, as illustrated in FIG. 20.

As illustrated in FIG. 17, the host 2 then transmits a trim command to invalidate previous data which become unnecessary due to write of the above update data, to the flash storage device 3. As illustrated in FIG. 18, if the previous data are stored in the locations corresponding to offset +0, offset +1, offset +2, and offset +3 of block BLK #0, the trim command designating the block address (=BLK #0), the offset (=+0), and the length (=4) is transmitted from the host 2 to the flash storage device 3 as illustrated in FIG. 21. The controller 4 of the flash storage device 3 updates the block management table 32 for block BLK #0 in response to the trim command (FIG. 17, step S37). In step S37, as illustrated in FIG. 21, each of the bit map flags corresponding to offsets +0 to +3 is changed from 1 to 0 in the block management table for block BLK #0.

Writing the tag (LBA) in plain text to the write destination block has been explained, but the tag (LBA) may be encrypted with a specific encryption key and the encrypted tag (LBA) may be written to the write destination block. The specific encryption key is an encryption key which is different from the above-explained plural encryption keys for user data. The specific encryption key is used commonly for encryption and decryption of all the addresses (tags (LBAs)).

FIG. 22 illustrates a sequence of read processing executed in the host 2 and the flash storage device 3.

It is assumed that the QoS domain/encryption key management table 33B' illustrated in FIG. 10 is used as the encryption key management table 33B included in the encryption key storage region 80 illustrated in FIG. 7.

The host 2 translates the a (LBA) included in a read request from user application into a block address and an offset (block offset) by referring to LUT 411 managed in the host 2. Then, the host 2 transmits a read command designating the block address, the offset, and the length to the flash storage device 3.

When the controller 4 of the flash storage device 3 receives the read command from the host 2, the controller 4 determines a block corresponding to the block address designated by the read command as a read target block, and determines a read target page, on the basis of the offset designated in the read command (step S41). In step S41, the controller 4 may first divide the offset designated in the read command by the number of the grains (4 in this case) indicative of the page size. Then, the controller 4 may determine a quotient and a remainder obtained by the division as the page address to be read and the page offset location to be read, respectively. The page address and the page offset may be included in the read command as the offset (block offset).

The controller 4 reads the encrypted data and the tag (LBA) from the NAND flash memory 5, on the basis of the block address, the offset, and the length (step S42). The controller 4 specifies the QoS domain to which the block indicated by the block address belongs (step S43). The controller 4 decrypts the read data (encrypted data) with the read tag (LBA) and an encryption key corresponding to the specified QoS domain (step S44). Then, the controller 4 sends the decrypted data to the host 2.

FIG. 23 illustrates a procedure of a garbage collection (GC) operation.

It is assumed that the QoS domain/encryption key management table 33B' illustrated in FIG. 10 is used as the encryption key management table 33B included in the encryption key storage region 80 illustrated in FIG. 7.

For example, if the number of remaining free blocks included in the free block list managed by the host 2 is a threshold value or less, the host 2 selects a GC source block and a GC destination block and transmits a GC control command designating the selected GC source block and the selected GC destination block to the flash storage device 3 (step S51). The GC source block and the GC destination block are the blocks which belong to the same QoS domain. Alternatively, when the number of remaining free blocks becomes smaller than or equal to the threshold value, in a configuration in which the controller 4 of the flash storage device 3 manages the free block list, the controller 4 may notify the host 2 of the reduction in the number of the free blocks and the host 2 receiving the notification may select the GC source block and the GC destination block and send the GC control command.

When receiving this GC control command, the controller 4 of the flash storage device 3 executes a data copy operation including (i) an operation of determining a location (copy destination location) in the GC destination block to which the valid data in the GC source block should be written, and (ii) an operation of copying the valid data in the GC source block to the copy destination location in the GC destination block (step S61). In step S61, the controller 4 copies both the valid data (encrypted valid data) in the GC source block (copy source block) and the tag (LBA) corresponding to the valid data, from the GC source block (copy source block) to the GC destination block (copy destination block). In this case, decryption and re-encryption of the encrypted valid data are not executed. A pair of the encrypted data and the tag (LBA) can be kept in the GC destination block (copy destination block). Since the GC destination block belongs to the same QoS domain as the GC source block, the same encryption key as the encryption key used when writing the data to the GC source block can be used, in the processing of decrypting the encrypted data read from the GC destination block. Furthermore, the tag (LBA) used when writing the data to the GC source block can also be acquired from the GC destination block. The encrypted data read from the GC destination block can be therefore decrypted correctly.

In addition, in step S61, the data copy operation is repeated until copying all of the valid data in GC source block is completed. If plural GC source blocks are designated in the GC control command, the data copy operation is repeated until copying all of the valid data in all of the GC source blocks is completed.

Then, the controller 4 notifies the host 2 of the tag (LBA) of the valid data, the destination physical address indicative of the copy destination location of the valid data, and the like, for each copied valid data, by using a callback command for the GC (step S62). The destination physical address corresponding to certain valid data is represented by the block address of the copy destination block (GC destination block) to which the valid data is copied, and an in-block physical address (block offset) indicative of the physical storage location in the copy destination block to which the valid data is copied.

When the host 2 receives this callback command for the GC, the host 2 updates LUT 411 managed in the host 2 and maps the destination physical address (block address and block offset) to the tag (LBA) corresponding to each of the copied valid data (step S52).

FIG. 24 illustrates an example of a data copy operation executed for GC.

In FIG. 24, it is assumed that the valid data stored in a location corresponding to offset +4 of the GC source block (block BLK #0 in this case) and the tag (LBA4) corresponding to the valid data are copied to a location corresponding to offset +0 of the CC destination block (block BLK #2 in this case) and that the valid data stored in a location corresponding to offset +10 of the GC source block (block BLK #0 in this case) and the tag (LBA10) corresponding to the valid data are copied to a location corresponding to offset +1 of the GC destination block (block BLK #2 in this case). In this case, the controller 4 notifies the host of {LBA4, BLK #2, offset +0, LBA10, BLK #2, and offset +1} (callback processing for GC).

FIG. 25 illustrates contents of LUT 411 of the host 2 updated as a result of the data copy operation illustrated in FIG. 24.

In the LUT 411, the block address and the offset corresponding to LBA4 are updated from BLK #0 and offset +4 to BLK #2 and offset +0. Similarly, the block address and the offset corresponding to LBA10 are updated from BLK #0 and offset +10 to BLK #2 and offset +1.

After the LUT 411 is updated, the host 2 may transmit a trim command designating BLK #0 and offset +4 to the flash storage device 3 and invalidate data stored in a location corresponding to offset +4 of BLK #0. Furthermore, the host 2 may transmit a trim command designating BLK #0 and offset +10 to the flash storage device 3 and invalidate data stored in a location corresponding to offset +10 of BLK #0.

Alternatively, the host 2 may not transmit the trim command, but the controller 4 may update the block management table 32 and invalidate the data as a procedure of the GC processing.

The data copy operation of copying both the encrypted data and the tag (LBA) from the copy source block to the copy destination block without decrypting or re-encrypting the encrypted data is not limited to GC, but may be applied to, for example, an operation of simply copying the specific encrypted data alone from the copy source block to the copy destination block or an operation of copying all the encrypted data in the copy source block to the copy destination block for wear leveling.

FIG. 26 illustrates another sequence of the encryption key change processing executed in the host 2 and the flash storage device 3.

It is assumed that the block/encryption key management table 33C illustrated in FIG. 11 is used as the encryption key management table 33B included in the encryption key storage region 80 illustrated in FIG. 7.

The host 2 can request the flash storage device 3 to change an encryption key as needed. In this case, the host 2 sends the encryption key change command including a block address to the flash storage device 3.

When the controller 4 of the flash storage device 3 receives the encryption key change command from the host 2, the controller 4 changes an encryption key for the block having the block address designated in the encryption key change command (step S71). Then, the controller 4 updates the block/encryption key management table 33C and associates the changed encryption key with the block having the designated block address (step S72).

Figure 27:
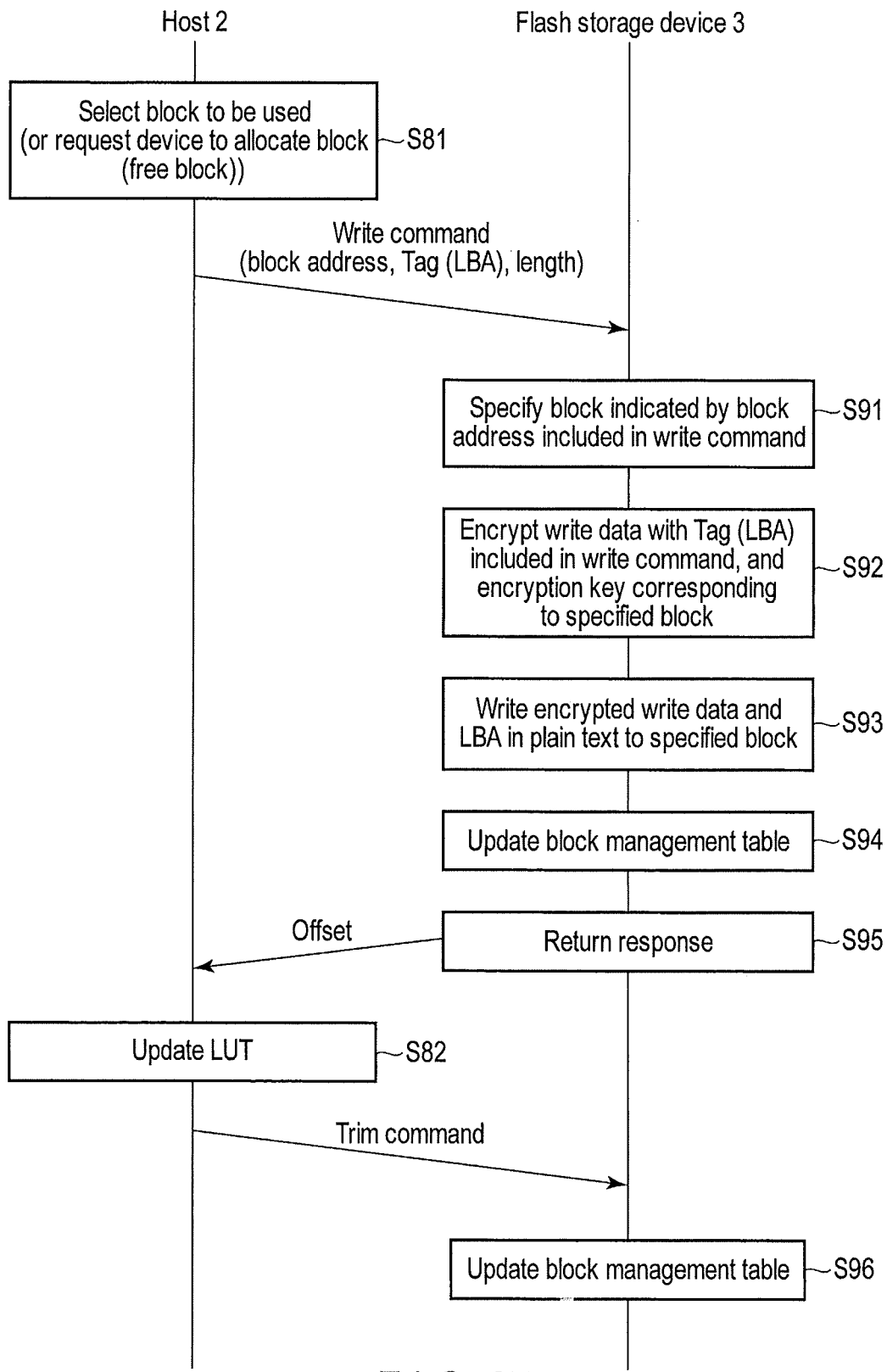
FIG. 27 is a sequence chart illustrating another sequence of the write processing executed in the host and the memory system according to the embodiment.

FIG. 27 illustrates another sequence of the write processing executed in the host 2 and the flash storage device 3.

It is assumed that the block/encryption key management table 33C illustrated in FIG. 11 is used as the encryption key management table 33B included in the encryption key storage region 80 illustrated in FIG. 7.

The host 2 first selects a block (free block) which is to be used for writing by itself or requests the flash storage device 3 to allocate a free block by transmitting a block allocate command to the flash storage device 3. Then, the host 2 sends to the flash storage device 3 a write command including the block address of the block selected by itself (or block address of the free block allocated by the flash storage device 3), the tag (LBA), and the length (step S81).

When the controller 4 of the flash storage device 3 receives the write command, the controller 4 specifies the block having the block address designated in the write command (step S91). In step S91, the block having the designated block address is selected as the write destination block. Next, the controller 4 encrypts write data associated with the write command, with the tag (LBA) included in the write command and an encryption key corresponding to the specified block (write destination block) (step S92).

The controller 4 writes the tag (LBA) in plain text to the selected write destination block together with the encrypted write data (step S93). The tag (LBA) in plain text is an (LBA) included in the write command. In step S93, if the write data has a length which is a multiple of the grain, plural tags (LBAs) corresponding to respective plural 4 KB data units that constitute the write data may be written to the write destination block as illustrated in FIG. 13 and FIG. 14.

The controller 4 updates the block management table 32 corresponding to the write destination block, and changes a bit map flag corresponding to the written data (i.e., a bit map flag corresponding to an offset (block offset) to which the data is written) from 0 to 1 (step S94).

Then, the controller 4 returns a response to the write command to the host 2 (step S95). This response includes at least the offset (block offset) to which the data is written.

When the host 2 receives this response, the host 2 updates LUT 411 managed in the host 2 and maps the physical address to each tag (LBA) corresponding to the written write data (step S82). The host 2 then transmits a trim command to invalidate previous data which become unnecessary due to the current write, to the flash storage device 3. The controller 4 of the flash storage device 3 updates the block management table 32 in response to the trim command (step S96).

Writing the tag (LBA) in plain text to the write destination block has been explained, but the tag (LBA) may be encrypted with a specific encryption key and the encrypted tag (LBA) may be written to the write destination block. The specific encryption key is an encryption key different from the plural encryption keys for data. The specific encryption key is used commonly for encryption and decryption of all the tags (LBA).

FIG. 28 illustrates another sequence of the read processing executed in the host 2 and the flash storage device 3.

It is assumed that the block/encryption key management table 33C illustrated in FIG. 11 is used as the encryption key management table 33B included in the encryption key storage region 80 illustrated in FIG. 7.

The host 2 translates a tag (LBA) included in a read request from the user application into a block address and an offset (block offset) by referring to LUT 411 managed in the host 2. Then, the host 2 transmits a read command designating the block address, the offset, and the length to the flash storage device 3.

When the controller 4 of the flash storage device 3 receives the read command from the host 2, the controller 4 determines a block corresponding to the block address designated in the read command as a read target block, and determines a read target page, on the basis of the offset designated in the read command (step S101). In step S101, the controller 4 may first divide the offset designated in the read command by the number of the grains (4 in this case) indicative of the page size. Then, the controller 4 may determine a quotient and a remainder obtained by the division as the page address to be read and the page offset location to be read, respectively. The page address and the page offset may be included in the read command as the offset (block offset).

The controller 4 reads encrypted data and the tag (LBA) from the NAND flash memory 5, on the basis of the block address, the offset, and the length (step S102). The controller 4 decrypts the read data (encrypted data) with the read tag (LBA) and the encryption key corresponding to the block indicated by the block address included in the read command (step S103). Then, the controller 4 sends the decrypted data to the host 2.

FIG. 29 illustrates another procedure of the garbage collection (GC) operation.

It is assumed that the block/encryption key management table 33C illustrated in FIG. 11 is used as the encryption key management table 33B included in the encryption key storage region 80 illustrated in FIG. 7.

For example, if the number of remaining free blocks included in the free block list managed in the host 2 becomes a threshold value or less, the host 2 selects a GC source block and a GC destination block and transmits a GC control command designating the selected GC source block and the selected GC destination block to the flash storage device 3 (step S111). Alternatively, when the number of remaining free blocks becomes smaller than or equal to the threshold value, in a configuration in which the controller 4 of the flash storage device 3 manages the free block list, the controller 4 may notify the host 2 of the reduction in the number of free blocks and the host 2 receiving the notification may select the GC source block and the GC destination block and send the GC control command.

When receiving this GC control command, the controller 4 of the flash storage device 3 executes a data copy operation including an operation of determining a location (copy destination location) in the GC destination block to which valid data in the GC source block should be written, and an operation of copying the valid data in the GC source block to the copy destination location in the GC destination block (step S121). In step S121, the controller 4 copies both the valid data (encrypted valid data) in the GC source block (copy source block) and the tag (LBA) corresponding to the valid data, from the GC source block (copy source block) to the GC destination block (copy destination block). In this case, decryption and re-encryption of the encrypted valid data are not executed. A pair of the encrypted data and the tag (LBA) can be kept in the GC destination block (copy destination block).

Then, the controller 4 updates the block/encryption key management table 33C and associates the encryption key associated with the GC source block, with the GC destination block (step S122). The same encryption key as the encryption key used when writing the data to the GC source block can be thereby used, in processing of decrypting the encrypted data read from the GC destination block. Furthermore, the tag (LBA) used when writing the data to the GC source block can also be acquired from the GC destination block. The encrypted data read from the GC destination block can be therefore decrypted correctly.

In addition, in step S122, the data copy operation is repeated until copying all of the valid data in GC source block is completed. If plural GC source blocks are designated in the GC control command, the data copy operation is repeated until copying all of the valid data in all of the GC source blocks is completed.

Then, the controller 4 notifies the host 2 of the tag (LBA) of the valid data, the destination physical address indicative of the copy destination location of the valid data, and the like, for each copied valid data, by using a callback command for the GC (step S123). The destination physical address corresponding to certain valid data is represented by the block address of the copy destination block (GC destination block) to which the valid data is copied, and an in-block physical address (block offset) indicative of a physical storage location in the copy destination block to which the valid data is copied.

When the host 2 receives this callback command for the GC, the host 2 updates LUT 411 managed in the host 2 and maps the destination physical address (block address and block offset) to the tag (LBA) corresponding to each of the copied valid data (step S112).

FIG. 30 illustrates another example of the data copy operation executed for the GC.

It is assumed that the block/encryption key management table 33C illustrated in FIG. 11 is used as the encryption key management table 33B included in the encryption key storage region 80 illustrated in FIG. 7.

In FIG. 30, it is assumed that valid data stored in a location corresponding to offset +4 of a GC source block (block BLK #0 in this case) and a tag (LBA4) corresponding to the valid data are copied to a location corresponding to offset +0 of a GC destination block (block BLK #x in this case) and that valid data stored in a location corresponding to offset +10 of the GC source block (block BLK #0 in this case) and a tag (LBA10) corresponding to the valid data are copied to a location corresponding to offset +1 of the GC destination block (block BLK #x in this case).

In this case, the controller 4 updates the block/encryption key management table 33C, and associates an encryption key KEY #0 associated with the GC source block (block BLK #0), with the GC destination block (block BLK #x). Thus, since the encryption key KEY #0 is used in processing of decrypting data read from the GC destination block (block BLK #x), the data can be decrypted correctly.

After this, the controller 4 notifies the host of {LBA4, BLK #x, offset +0, LBA10, BLK #x, and offset +1} (callback processing for GC).

Figures 31, 32:
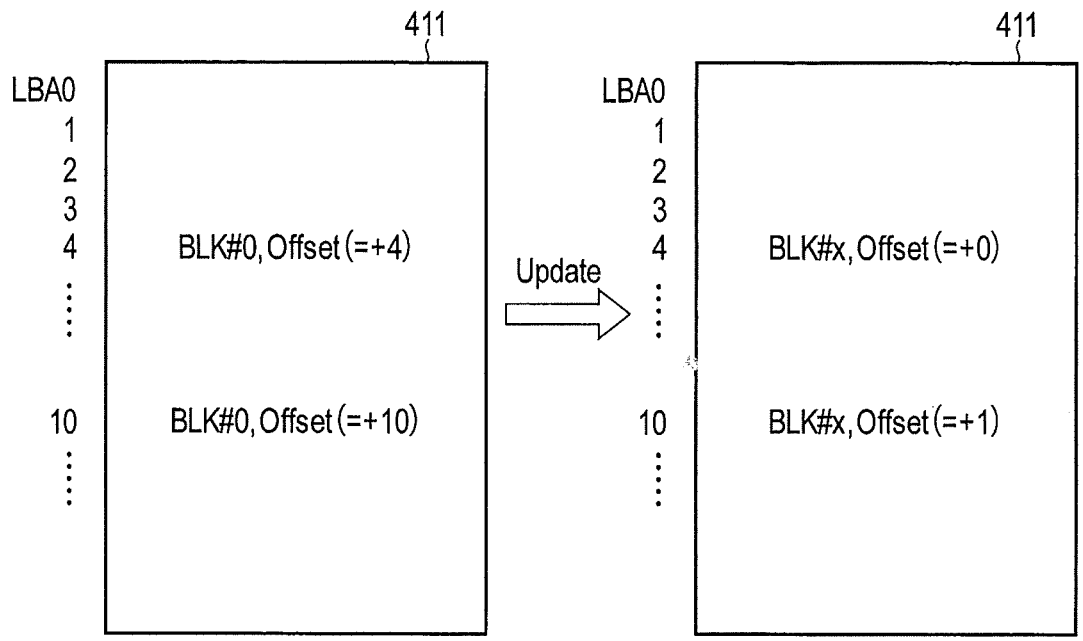
FIG. 31 is a diagram illustrating contents of the lookup table in the host updated as a result of the data copy operation illustrated in FIG. 30.
FIG. 32 is a table illustrating an encryption key change command issued to the memory system according to the embodiment.

FIG. 31 illustrates contents of LUT 411 in the host 2 updated as a result of the data copy operation illustrated in FIG. 30.

In the LUT 411, the block address and the offset corresponding to LBA4 are updated from BLK #0 and offset +4 to BLK #x and offset +0. Similarly, the block address and the offset corresponding to LBA10 are updated from BLK #0 and offset +10 to BLK #x and offset +1.

After the LUT 411 is updated, the host 2 may transmit a trim command designating BLK #0 and offset +4 to the flash storage device 3 and invalidate the data stored in a location corresponding to offset +4 of BLK #0. Furthermore, the host 2 may transmit a trim command designating BLK #0 and offset +10 to the flash storage device 3 and invalidate data stored in a location corresponding to offset +10 of BLK #0.

Alternatively, the host 2 may not transmit the trim command, but the controller 4 may update the block management table 32 and invalidate the data as a procedure of the GC processing.

The data copy operation of copying both the encrypted data and the tag (LBA) from the copy source block to the copy destination block without decrypting or re-encrypting the encrypted data is not limited to GC, but may be applied to, for example, an operation of simply copying a specific encrypted data alone from the copy source block to a copy destination block or an operation of copying all the encrypted data in a copy source block to a copy destination block for wear leveling.

FIG. 32 illustrates an encryption key change command issued to the flash storage device 3.

The encryption key change command is a command to request the flash storage device 3 to change an encryption key. The host 2 can request the flash storage device 3 to change an encryption key by sending the encryption key change command to the flash storage device 3, and can thereby change an encryption key corresponding to a designated region (QoS domain).

The encryption key change command includes a command ID and a QoS domain ID. The command ID is an ID (command code) indicating that this command is the encryption key change command, and the command ID for encryption key change command is included in the encryption key change command. The QoS domain ID is an identifier indicative of one of plural regions of the NAND flash memory 5 and is indicative of the region (QoS domain) corresponding to the encryption key to be changed.

The encryption key change command may include a namespace ID as a region ID, instead of the QoS domain ID. Alternatively, the encryption key change command may include a block address instead of the region ID such as the QoS domain ID or the namespace ID.

FIG. 33 illustrates a block allocate command issued to the flash storage device 3.

The block allocate command is a command to request the flash storage device 3 to allocate a block (free block) (block allocate request). The host 2 can require the flash storage device 3 to allocate a free the block address of the allocated free block, by transmitting the block allocate command to the flash storage device 3.

The block allocate command includes a command ID and a QoS domain ID. The command ID is an ID (command code) indicating that this command is the block allocate command, and the command ID for a block allocate command is included in the block allocate command. The QoS domain ID is an identifier indicative of one of plural regions of the NAND flash memory 5, and the block address of a free block newly allocated to the host 2 is associated with the QoS domain having the QoS domain ID.

In a case where the flash storage device 3 manages each of the free blocks by the free block list and the host 2 does not manage the free block groups, the host 2 requires the flash storage device 3 to allocate a free block and thereby acquires the block address. In contrast, in a case where the host 2 manages each of the free blocks by the free block list, the host 2 does not need to transmit the block allocate command to the flash storage device 3 since the host 2 can select one of the free blocks by itself.

FIG. 34 illustrates a response to the block allocate command.

When the flash storage device 3 receives the block allocate command from the host 2, the flash storage device 3 selects a free block which should be allocated to the host 2, of the free block list, and returns the response including a block address of the selected free block to the host 2.

This response may include the QoS domain ID included in the block allocate command, i.e., the QoS domain ID indicative of a QoS domain associated with the selected free block.

FIG. 35 illustrates a write command issued to the flash storage device 3.

The write command is a command to request the flash storage device 3 to write data. This write command may include a command ID, a region ID, a block address, a tag, a length, and the like.

The command ID is an ID (command code) indicating that this command is the write command, and the command ID for the write command is included in the write command.

The region ID is an identifier indicative of one of the plural regions of the NAND flash memory 5 and is indicative of a region where the data is to be written. The region ID may be a QoS domain ID or a namespace ID.

The block address is indicative of a block to which the data is to be written.

The tag is an address for identifying the write data which is to be written. A logical address such as an LBA (start LBA) may be used as the tag. The start LBA is indicative of a first logical location (first logical address) to which the data is to be written.

The length is indicative of a length of the write data to be written. This length (data length) may be designated by the number of grains or the number of LBAs, or the size may be designated by bytes.

FIG. 36 illustrates a response to the write command illustrated in FIG. 35.

This response may include the block address, in-block physical address and the length. The block address is indicative of the block to which the data is written. The in-block physical address is indicative of a location in the block (physical storage location) to which the data is written. The in-block physical address can be designated by the block offset as explained above. The length is indicative of the length of the written data. This length (data length) may be designated by the number of grains or the number of LBAs, or the size may be designated by bytes.

Alternatively, the response may include not only the block address, in-block physical address and the length, but also the tag (LBA). The tag (LBA) is a tag (LBA) included in the write command in FIG. 35.

FIG. 37 illustrates a trim command issued to the flash storage device 3.

The trim command is a command including a physical address (block address) and an in-block physical address (block offset) indicative of a physical storage location in which data to be invalidated is stored. In other words, the trim command can designate not the logical address such as an LBA, but the physical address. The trim command includes a command ID, a physical address, and a length.

The command ID is an ID (command code) indicating that this command is the trim command, and the command ID for the trim command is included in the trim command.

The physical address is indicative of a first physical location to which the data to be invalidated is stored. In the present embodiments, the physical address is designated by a combination of the block address and the offset (block offset).

The length is indicative of a length of the data to be invalidated. This length (data length) may be designated by the number of grains or bytes.

The controller 4 manages a flag (bit map flag) indicating validity/invalidity of each of the data included in respective blocks, by using the block management table 32. When the controller 4 receives from the host 2 the trim command including the block address and the offset (block offset) indicative of the physical location in which the data to be invalidated is stored, the controller 4 updates the block management table 32, and changes the flag (bit map flag) corresponding to the data of the physical location corresponding to the block address and the block offset included in the trim command to a value indicative of invalidity.

FIG. 38 illustrates a read command issued to the flash storage device 3.

The read command is a command to request the flash storage device 3 to read data. The read command may include a command ID, a region ID, a physical address PBA, and a length.

The command ID is an ID (command code) indicating that this command is the read command, and the command ID for the read command is included in the read command.

The region ID is an identifier indicative of one of the plural regions of the NAND flash memory 5 and is indicative of a region from which the data is to be read. The region ID may be a QoS domain ID or a namespace ID.

The physical address PDA is indicative of a first physical location from which the data is to be read. The physical address PBA is designated by a block address and an offset (block offset).

The length is indicative of a length of the data to be read. The data length can be designated by the number of grains.

FIG. 39 illustrates a GC control command issued to the flash storage device 3.

The GC control command is used to notify the flash storage device 3 of a GC source block address and a GC destination block address. The host 2 manages the valid data amount/invalid data amount in each block, and can select several blocks in which the valid data amount is smaller as GC source blocks. In addition, if the host 2 manages the free block list, the host 2 can select several free blocks as GC destination blocks. The GC control command may include a command ID, a GC source block address, a GC destination block address, and the like.

The command ID is an ID (command code) indicating that this command is the GC control command, and the command ID for the GC control command is included in the GC control command.

The GC source block address is a block address indicative of the GC source block. The host 2 can designate a block which should be the GC source block.

The GC destination block address is a block address indicative of the GC destination block. The host 2 can designate a block which should be the GC destination block.

FIG. 40 illustrates a callback command for GC.

The callback command for GC is used to notify the host 2 of the tag (LBA) of the valid data copied by the GC, and the block address and the offset indicative of a copy destination location of the valid data.

The callback command for GC may include a command ID, a tag (LBA), a length, and a destination physical address.

The command ID is an ID (command code) indicating that this command is the callback command for GC, and the command ID for the callback command for GC is included in the callback command for GC.

The tag is an address for identifying the valid data copied from the GC source block to the GC destination block by GC. A logical address such as an LBA (start LBA) may be used as the tag.

The length is indicative of a length of the copied data. The data length may be designated by the number of grains.

The destination physical address is indicative of a location in the GC destination block in which the valid data has been copied. The destination physical address is designated by the block address and the offset (block offset).

As described above, according to the present embodiment, when a write request that designates a tag (first address) for identifying write data to be written is received from the host 2, the write data is encrypted with a first encryption key selected from plural encryption keys and the tag (first address), and the encrypted write data is written to a block of plural blocks of the NAND flash memory 5 together with the tag (first address). When a read request that designates a physical address indicative of a physical storage location in a block where encrypted data is stored is received from the host 2, both the encrypted data and the tag (first address) are read from the block, on the basis of the physical address. Then, the read encrypted data is decrypted with the first encryption key and the read tag (first address).

Thus, in processing of decrypting the read encrypted data, not the address (physical address) designated by the read request, but the tag (first address) read from the NAND flash memory 5 together with the encrypted data is used. Therefore, even in a configuration that different addressing methods are employed for the data write and the data read, the data can be encrypted with the first encryption key and the first address for identifying the data, and the encrypted data can be decrypted correctly with the first address (address written together with the encrypted data) read from the NAND flash memory 5.

The flash storage device 3 may be utilized as one of plural flash storage devices 3 provided in a storage array. The storage array may be connected to an information processing device such as a server computer via a cable or a network. The storage array comprises a controller which controls the flash storage devices 3 in the storage array. If the flash storage devices 3 are applied to the storage array, the controller of the storage array may function as the host 2 for the flash storage devices 3.

In the present embodiment, a NAND flash memory is disclosed as an example of the nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory including a plurality of blocks; and
a controller electrically connected to the nonvolatile memory and configured to:
in response to receiving from the host a write request that designates at least a first logical address for identifying data to be written, encrypt the data with the first logical address and a first encryption key, write the encrypted data to a first location in a first block of the nonvolatile memory, and write the first logical address to a second location in the first block, the second location being different from the first location; and
in response to receiving from the host a read request that designates at least an identifier of the first block, read both the encrypted data and the first logical address from the first location and the second location in the first block, respectively, and decrypt the read encrypted data with the first encryption key and the read first logical address, wherein
the write request further designates the identifier of the first block, and
the controller is further configured to:
manage correspondence between a plurality of encryption keys and a plurality of regions obtained by logically dividing the nonvolatile memory;
when receiving the write request, select an encryption key associated with a region to which the first block belongs, as the first encryption key, on the basis of the identifier of the first block designated by the write request; and when receiving the read request, select an encryption key associated with the region to which the first block belongs, as the first encryption key on the basis of the identifier of the first block designated by the read request.

2. The memory system of Cairn wherein
the controller is configured to write the first logical address in plain text to the second location in the first block.

3. The memory system of Cairn 1, wherein
the controller is configured to encrypt the first logical address with a specific encryption key which is different from the first encryption key and which is used commonly for encryption and decryption of all logical addresses for identifying data to be written, and write the encrypted first logical address to the second location in the first block.

4. The memory system of claim 1, wherein
the controller is further configured to:
manage a table for managing correspondence between the plurality of blocks and the plurality of encryption keys; and when copying the encrypted data from the first block to a copy destination block in the nonvolatile memory, copy both the encrypted data and the first logical address from the first block to the copy destination block, without decrypting or re-encrypting the encrypted data; and update the table to associate an encryption key associated with the first block, with the copy destination block.

5. The memory system of claim 1, wherein
the controller is further configured to:
manage a table for managing correspondence between a plurality of encryption keys and theme plurality of regions obtained by logically dividing the nonvolatile memory; and when copying the encrypted data to a copy destination block in the nonvolatile memory belonging to a same region as a region to which the first block belongs, copy both the encrypted data and the first logical address from the first block to the copy destination block, without decrypting or re-encrypting the encrypted data.

6. A memory system connectable to a host, comprising:
a nonvolatile memory including a plurality of blocks; and
a controller electrically connected to the nonvolatile memory and configured to:
in response to receiving from the host a write request that designates at least a first logical address for identifying data to be written and an identifier of a first block of the nonvolatile memory, encrypt the data with the first logical address and a first encryption key, write the encrypted data to a first location in the first block, and write the first logical address to a second location in the first block, the second location being different from the first location; and in response to receiving from the host a read request that designates at least an identifier of the first block and an in-block physical address indicative of the first location in the first block, read both the encrypted data and the first logical address from the first location and the second location in the first block, respectively, on the basis of the identifier of the first block and the in-block physical address, and decrypt the read encrypted data with the first encryption key and the read first logical address, wherein the write request further designates the identifier of the first block, and
the controller is further configured to:
manage correspondence between a plurality of encryption keys and a plurality of regions obtained by logically dividing the nonvolatile memory;
when receiving the write request, select an encryption key associated with a region to which the first block belongs, as the first encryption key, on the basis of the identifier of the first block designated by the write request; and
when receiving the read request, select an encryption key associated with the region to which the first block belongs, as the first encryption key, on the basis of the identifier of the first block designated by the read request.

7. A method of controlling a nonvolatile memory including a plurality of blocks, the method comprising:
in response to receiving from a host a write request that designates at least a first logical address for identifying data to be written, encrypting the data with the first logical address and a first encryption key, writing the encrypted data to a first location in a first block of the nonvolatile memory, and writing the first logical address to a second location in the first block, the second location being different from the first location: and in response to receiving from the host a read request that designates at least an identifier of the first block, reading both the encrypted data and the first logical address from the first location and the second location in the first block, respectively, and decrypting the read encrypted data with the first encryption key and the read first logical address, wherein the write request further designates the identifier of the first block and
the method further comprises:
managing correspondence between a plurality of encryption keys and a plurality of regions obtained by logically dividing the nonvolatile memory;
when receiving the write request, selecting an encryption key associated with a region to which the first block belongs, as the first encryption key, on the basic of the identifier of the first block designated by the write request; and
when receiving the read request, selecting an encryption key associated with the region to which the first block belongs, as the first encryption key, on the basis of the identifier of the first block designated by the read request.

* * * * *